US011443588B1

(12) United States Patent
Zlimen et al.

(10) Patent No.: US 11,443,588 B1
(45) Date of Patent: Sep. 13, 2022

(54) ALGORITHMIC RELATIONAL ODDS NEXUS SYSTEM

(71) Applicants: Leo Zlimen, Nevada City, CA (US); Bowen Kyle, Nevada City, CA (US)

(72) Inventors: Leo Zlimen, Nevada City, CA (US); Bowen Kyle, Nevada City, CA (US)

(73) Assignee: Ladris Technologies, Inc., Nevada City, CA (US)

( * ) Notice: Subject to any disclaimer, the term of this patent is extended or adjusted under 35 U.S.C. 154(b) by 0 days.

(21) Appl. No.: 17/570,081

(22) Filed: Jan. 6, 2022

(51) Int. Cl.
  *G07F 17/32* (2006.01)
  *G06N 3/02* (2006.01)
  *G06Q 50/34* (2012.01)

(52) U.S. Cl.
  CPC ............. *G07F 17/323* (2013.01); *G06N 3/02* (2013.01); *G06Q 50/34* (2013.01); *G07F 17/3288* (2013.01)

(58) Field of Classification Search
  CPC ..... G07F 17/323; G07F 17/3288; G06N 3/02; G06Q 50/34
  See application file for complete search history.

(56) References Cited

U.S. PATENT DOCUMENTS

| | | | | |
|---|---|---|---|---|
| 2010/0106714 A1* | 4/2010 | Lim | ......................... | G06N 3/12 707/718 |
| 2019/0213488 A1* | 7/2019 | Zou | ......................... | G06N 5/04 |
| 2020/0111325 A1* | 4/2020 | Lockton | ................ | G07F 17/323 |

* cited by examiner

*Primary Examiner* — Corbett B Coburn
(74) *Attorney, Agent, or Firm* — Foundation Patents, LLP; Richard Bennett Salles

(57) ABSTRACT

Embodiment method and associated apparatus relate to altering the expected value of a system modeled by a random process simplified to produce a binary outcome. Various embodiments modify a genetic algorithm to optimize such settings as population size, number of iterations to convergence, mutation chance, and sample space. Some embodiment ARON implementations correctly predict game outcome relative to the spread, based on transforming unrelated raw data, applying the transformed raw data to a modified genetic algorithm, generating multiple expected outcomes determined by the modified genetic algorithm as a function of the transformed raw data, and filtering the outcomes as a function of predefined metrics to produce a single end result that can be utilized effectively by an evolutionary-style algorithm. Various embodiment implementations use modified genetic algorithms with embedded neural network architecture to model and predict for a user a discrete forecast of a game-like scenario using selectively processed historical data.

20 Claims, 26 Drawing Sheets

ALGORITHMIC RELATIONAL ODDS NEXUS SYSTEM

TECHNICAL FIELD

Various embodiments relate generally to genetic algorithms with novel additions and dynamic environments that utilize neural network architectures to create high-dimensional sample spaces, and computer-implemented methods & useful technological embodiments stemming therefrom.

BACKGROUND

A genetic algorithm is an artificial intelligence construct that solves nonlinear optimization problems by simulating evolution. A finite population (or set of solutions) is randomly created where each organism has a genetic makeup that represents a single point in the sample space. The sample space is traversed primarily through the use of three operations inspired by Darwin's theory of evolution: mutation, selection, and crossover.

If all three of these operations are well implemented the program will traverse the sample space and converge to a global solution. The randomness of a genetic algorithm allows it to traverse very large sample spaces in a computationally feasible amount of time. The evolutionary operators lead to a metaheuristic approach that avoids the pitfalls of common optimization algorithms such as non-linearity, outlier data, and convergence to local solutions.

Prior art implementations of genetic algorithms have drawbacks. In some prior art genetic algorithm implementations, the environment constructed by the genetic algorithm is static. That is to say, the metric for assessing fitness of points in the sample space is constant throughout the evolutionary simulation. This can cause a convergence to a local maxima rather than a global solution. A local maxima is a value in a set of values for a mathematical function or algorithm where there may be other values in the set of values that are greater than the local maxima, but there are no values relatively near the local maxima that are greater than the local maxima. You can think of possible solutions in a genetic algorithm's sample space as points along an X-Y (or, more generally, a coordinate system of any dimension) axis that form a series of curves where peaks are possible solutions. A local maxima can be thought of as a peak on one of those curves that is lower than one or more of the other curve peaks.

A practical illustration of this problem is gambling technology with binary outcomes that are artificially biased in favor of the oddsmaker and wherein said bias is utilized and improved by novel computer technology. What is needed therefore is technology that manipulates a genetic algorithm to dynamically alter the expected value in favor of the technology-user (the bettor). Such a technical process would produce a game-like uniquely-computerized scenario determined by an unrelated amalgam of data.

What is needed therefore is an appropriate, new machine learning genetic algorithm and its computer implemented system manifested in a "living" gambling (inter alia) application-and-database system that may also be outfitted with a unique API for user interaction. In particular, neural network architecture is the most proven method for analyzing data of this form. Neural networks transform the input data into higher dimensional space through a series of non-linear transformations, and then project the higher dimensional classification back down to the output space. The instant technology is an effective neural network which specifies a behavior for these transformations such that an accurate classification is produced. Common methods such as gradient descent have proven to be inapplicable to the general problem of abstract game classification because they do not traverse the global sample space. Rather, they merely converge to local maxima, they suffer from numerical instability for certain training data, and they require labeled training data (supervised learning). To overcome these issues, the instant technology advantageously uses a genetic algorithm with novel additions such as a dynamic fitness threshold, capability for weighted training examples, and augmentation of input data to evolve a population of neural networks to generate optimal solutions for predicting results of an abstract game (in the preferred embodiment, odds to a sports game).

SUMMARY

The invention, the ARON System, alters (inter alia) a generally-accepted, customarily-expected final score of a sports game by modeling random multi-input processes and settings and simplifying them to produce a novel binary outcome. The invention modifies a genetic algorithm to optimize settings (e.g. population size, number of iterations to convergence, mutation chance and sample space). The System correctly predicts outcomes relative to the generally-accepted point spread by transforming unrelated raw data, applying the transformed data to a modified genetic algorithm, generating multiple expected outcomes determined by the algorithm as a function of the transformed raw data, and filtering the outcome as a function of predefined metrics to produce a single end result that is utilized by the evolutionary-style algorithm. The invention configures its modified genetic algorithms with embedded neural network architecture to model and predict a discrete forecast of a game using selectively processed historical data. When the System possesses inputs for a particular game, its CPU sequentially executes instructions provided by the ARON System continuously. The System's CPU accesses and retrieves data located in its relational database. Inside the relational database, instructions within the ARON System's CPU processes a particular game's data. The data processing System instructs its CPU to weigh the recency of the instance to which it belongs, therein initializing its neural network to use hyper-parameters and settings generated by the System's modified evolutionary genetic algorithm over multiple GPU cores in parallel. The ARON system then loads this information into its relational database architecture and pushes it through a series of selective filters, the values of which are determined by the ARON System executing a separate algorithm on its CPU to determine the likelihood it has made a favorable assessment. Having pushed the data through these selective filters, the ARON System's CPU then displays this information to the user via GUI's or provides the information on a server that receives the information via API.

Technology is disclosed for systems and methods for processing an Algorithmic Relational Odds Nexus (ARON). The fundamental components of processing ARON are:

A. Take in raw data pertaining to previous game-like scenarios;

B. Systematically transform raw data to account for natural constraints that are not initially reflected by the data;

C. Feed the data into an optimized version of an evolutionary algorithm, to be simulated on various orders of magnitude;

D. Generate a metric of deviation to which algorithmic outputs are compared, keeping only those that differ to a significant degree;

E. Filter the remaining outputs by keeping only those that qualify under a metric generated by the algorithm that indicates optimum functionality; and F. System compares the filtered outputs that deviate significantly to the original external input, and from this comparison the system generates (out of all possible options) one final discrete forecast.

Also fundamental to the ARON system is a new modification to, and extension of, a genetic algorithm. The concept of a genetic algorithm functions as a template wherein the programmer is meant to tailor the settings, sample space, and fundamental process through which the problem is framed, considered, and ultimately solved to fit their specific optimization problem. In this sense, the instant ARON System applies a new implementation of a genetic algorithm through its extensive testing to optimize such settings as population size, number of iterations to convergence, mutation chance, and provide a high dimensional feature space that can be non-linearly optimized using neural network architecture in the gene composition of the genetic algorithm for the user.

A common example of a mutation chance is, in layman's terms, the chance that a particular gene (in this case, the unique coefficient for one statistic in one model) would be mutated (assigned a random value, as opposed to inheriting one from its parents). This example is important because, when a mutation occurs, for the existing value (out of a list of possible values), "crossover" is bypassed. The specific gene is assigned to a random value from the sample space instead of the value being inherited from one of its parent organisms. This improvement is significant because it helps traverse the sample space, and avoids local minima or maxima; in other words, it may result in a uniquely-suited solution.

More significantly, the ARON System modifies the overall genetic algorithm structure for the purpose of predicting game-like scenarios. In prior art implementations of genetic algorithms, the constructed environment is static; that is to say, the metric for assessing fitness is constant throughout the simulation. Fundamental to the ARON System is a dynamic environment which insures that the number of iterations is such that the evolutionary operators have the optimal amount of freedom to traverse a large enough subset of the sample space without converging to local maxima. The ARON System alters the algorithmic operations on the fly by self-analyzing its own metric for fitness and by determining whether it is converging to a local maxima. Due to this process, the ARON System never runs the same way twice. Additionally, in various embodiments, the ARON System's new implementation of neural network architecture as the solution design and predictive procedure in the genetic algorithm provides for high dimensional augmentation of the sample space as well as the ability to discern non-linear solutions (a pitfall of the standard genetic algorithm).

In various embodiments, ARON takes the current statistical data attributed to various game-like scenarios and outputs on a per-game basis a distribution of values from which a value may be selected representing the correct forecast for each game.

The ARON System achieves this result via a multi-step process that first transforms the raw data, applies it to a modified genetic algorithm, generates multiple expected outcomes, and then filters these outcomes via a series of predefined metrics to produce a single end result. This process operates to transform unrelated data into a correlated distribution from which a single binary value may be selected. Various embodiment ARON processing structure implementations are capable of altering the fundamental expected value of a series of random experiments with biased binary payouts. In some embodiment designs, data is sorted into structures by the value and type of the units involved, some of these structures being, in several exemplary scenarios, per-match statistics by player, per-game statistics by team, per-election statistics by precinct, or per-precinct statistics by voter.

The ARON System is advantageously able to correctly identify the correct betting choice against the spread at a percentage well above the required 52.38% (assuming a standard 10% vigorish), thereby turning the overall expected value positive.

The herein-disclosed ARON process implementation is able to correctly predict the outcome of games relative to the spread at a significantly high percentage without direct human assistance, based on transforming unrelated raw data, applying the transformed raw data to a modified genetic algorithm, generating multiple expected outcomes determined by the modified genetic algorithm as a function of the transformed raw data, and filtering the outcomes via a series of predefined metrics to produce a single end result that is utilized effectively by an evolutionary-style algorithm-processing system.

In some scenarios exemplary of various embodiment ARON implementations' design and usage, a similar transformation may be applied in the context of predicting other game-like scenarios—for instance, political elections or stock futures. In an illustrative example, the step of filtering multiple expected outcomes via a series of predefined metrics to produce a single end result is based on converting a Spread into a Game Spread Ratio (GSR) that approximates the outcome of a game (or other discreet instance) as predicted by the Spread, and the ARON System takes in the defining external metric against which success or failure is measured, and transform the external metric into a value that is utilized effectively by evolutionary-style algorithm-processing technology.

The ARON system invention ultimately functions via the components of a memory storage device component; a network interface; a display device; and at least one processor.

The details of various embodiments are set forth in the accompanying drawings and the description below. Other features and advantages will be apparent from the description and drawings, and from the claims.

DEFINITIONS

Figure 1:
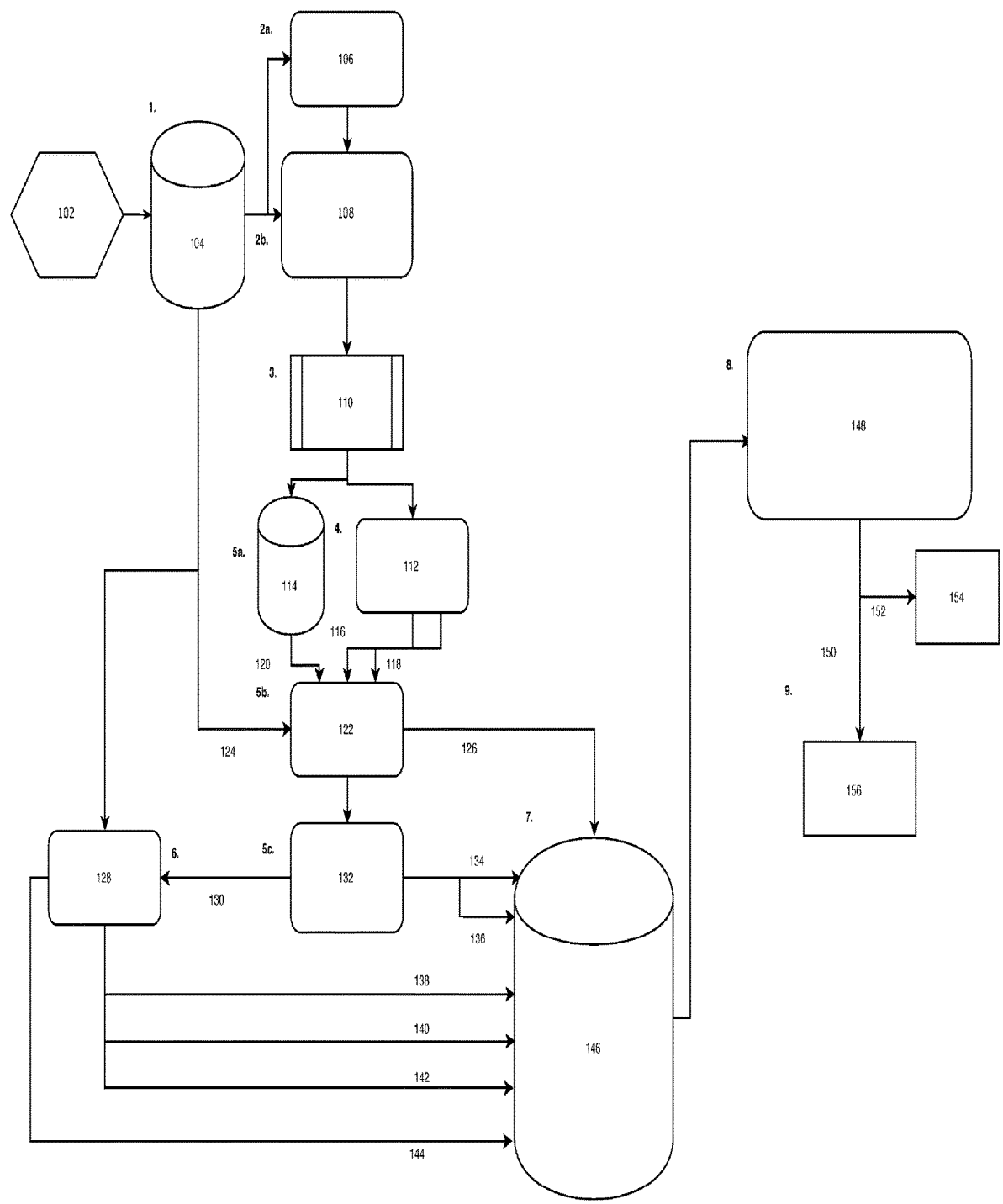
FIG. 1 depicts a labeled flowchart of a high-level program structure for The ARON System subdivided into nine broader sections.

Algorithmic Efficiency Metric: an artificial variable representing the extent to which the algorithm performed its operations to the standard demanded by a given implementation; for instance, the number of generations needed for a general solution to be identified. This is consistent with various embodiments.

Target Data: The desired output data associated with a set of training data. For example, the true GSR for a training game, or the label of an image in the MNIST database.

Game-Like Scenario: an instance of an event or set of events that can be realized and modeled as a "game" of sorts; wherein multiple contenders, hereinafter referred to as "Teams", seek to fulfill a predefined condition of success or failure.

Associated Model Identifier (AssociatedModelID): a user parameter that represents the ID of the Validation Model from which the current version of the program inherits its particular settings. A validation model is a set of retroactive predictions used to determine the accuracy and efficacy of the system, consistent with various embodiments.

ATS Pick Against: an artificial variable representing the number of predictions out of the entire Prediction Sample that do not favor a given Team after having compared the prediction to the Spread (for example, the favored Team winning the game, but by less than predicted by the Spread), consistent with various embodiments.

ATS Pick For: an artificial variable representing the number of predictions out of the entire Prediction Sample that do favor a given Team after having compared the prediction to the Spread (for example, the favored Team winning the game, and doing so by more than predicted by the Spread, consistent with various embodiments.

Choice Count (ChoiceCount): a calculated variable used to represent the number of predictions out of the entire Prediction Sample that collectively constitute the magnitude of the program's final prediction for a given game-like scenario (for example, the program favors a particular team in 700 of the 1000 predictions, or 70%), consistent with various embodiments.

Default Weight Factor (DWF): an artificial variable that consists of a user-determined initial value which is applied to give appropriate relevance to certain sets data values (for example, data from the current season might be more relevant than data from the previous season, and so will be given a greater default weight), consistent with various embodiments.

Dynamic Control Variable (DynamicControlVariable): a user parameter that represents a metric created by the program which is analogous to a predictive metric made by an external body, consistent with various embodiments. For example, a Game Spread Ratio (GSR), which can be seen as the program's own interpretation of the spread.

External Experimental Variable (ExternalExperimentalVariable): a user parameter that constitutes a predictive metric created by an external body, consistent with various embodiments. For example, a spread set by an Oddsmaker.

Figure 3:
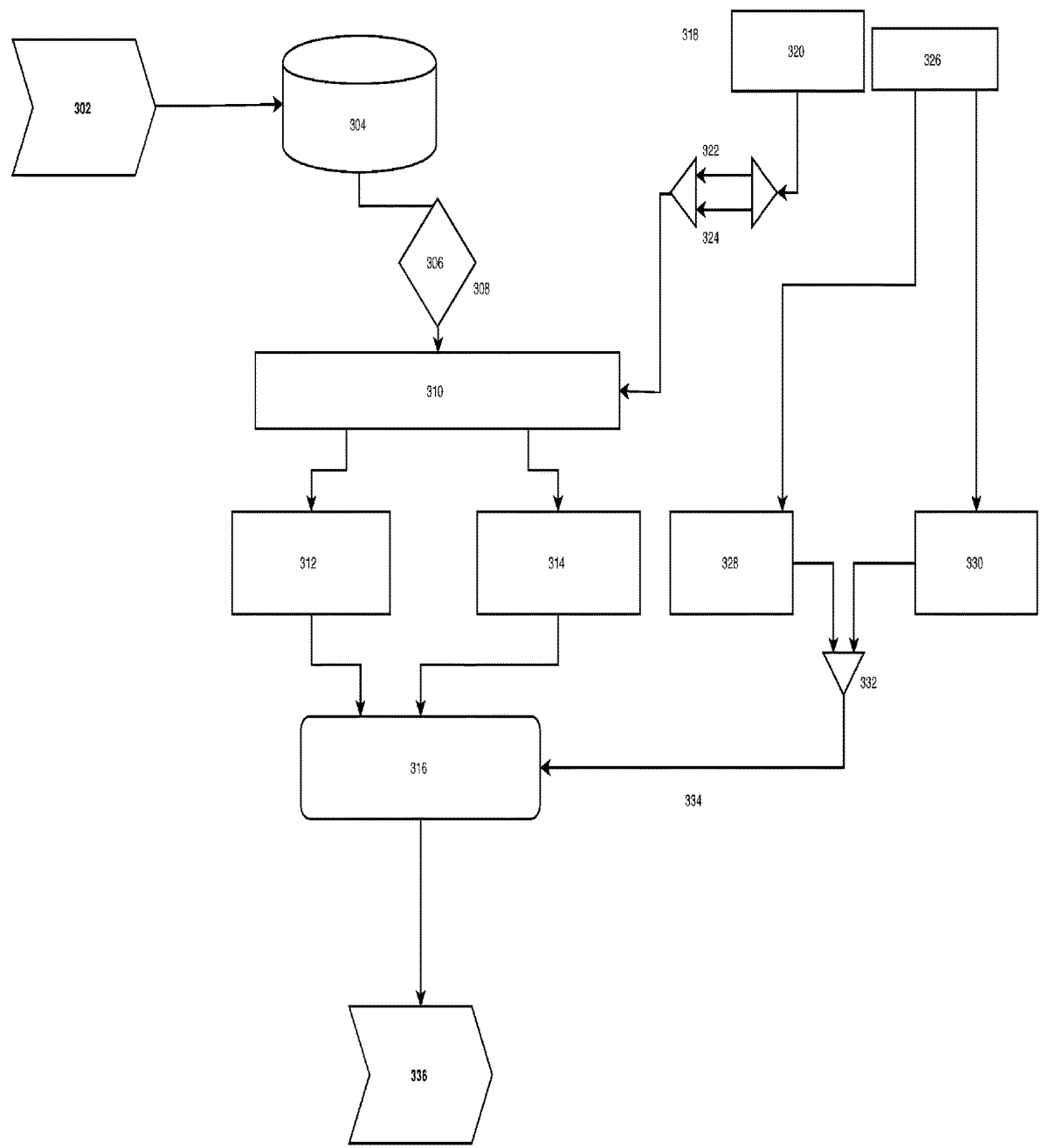
FIG. 3 depicts Flowchart 2A, a flowchart for the initial normalization of raw data, consistent with various embodiments.
Figure 4:
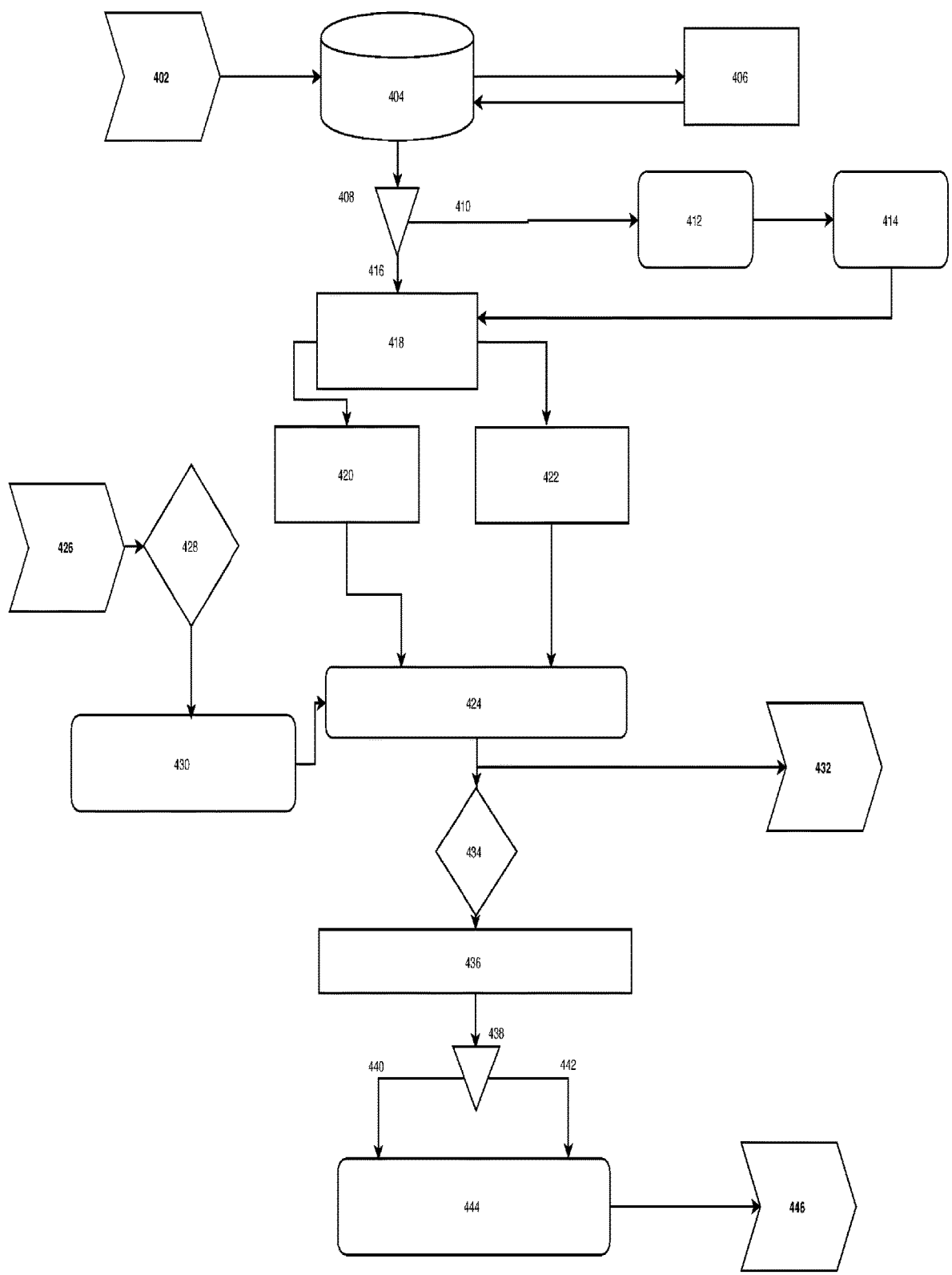
FIG. 4 depicts Flowchart 2B, a flowchart for the calculation of modified averages, consistent with various embodiments.

Final Average, Previous (FA): an artificial variable that is created via the processes described in FIGS. 3 and 4 and constitutes input data that will be used during algorithmic operations, consistent with various embodiments.

Floor Talent Change (FTC): a calculated variable used to identify and filter unreliable data, consistent with various embodiments.

FTC Limit (FTCLimit): a user parameter with a decimal value that is between 0 and 1, and that correlates to the maximum acceptable percentage by which the talent on the floor can change before the game is flagged as having potentially unreliable data, consistent with various embodiments.

Game Spread Ratio (GSR): a calculated variable that represents the expected ratio of the predicted or observed total points scored by each team in a given game, consistent with various embodiments. GSR is a concept that amounts to an analog of the real-life integer or decimal point spread. It is calculated on a per-game basis.

GSR Lower: a calculated variable that represents the predicted or observed total points scored by one of the two teams (as described in detail herein). This is the denominator of the overall GSR, and is consistent with various embodiments.

GSR Upper: a calculated variable that represents the predicted or observed total points scored by the other of the two teams (as described in detail herein). This is the numerator of the overall GSR, and is consistent with various embodiments.

GSR, Median (MedianGSR): a calculated variable representing the median value of all of the GSRs generated by the algorithm, consistent with various embodiments.

GameID: a user parameter that represents the game that the user would like to predict, consistent with various embodiments. It can also represent the target game-like scenario that a user would like to predict (including but not limited to an election outcome, a stock movement, or sports game).

Local Maxima: a value in a set of values for a mathematical function or algorithm where there may be other values in the set of values that are greater than the local maxima, but there are no values relatively near the local maxima that are greater than the local maxima.

Odds Maker Identifier (OddsmakerID): a user parameter that represents the ID of the Oddsmaker associated with the spread (or other external experimental variable), consistent with various embodiments.

Official Designation (OfficialDesignation): a user parameter that represents the designation of the prediction as being either official (only one single prediction for the given GameID exists) or unofficial (a trial run or a debugging instance, for example), consistent with various embodiments.

Participant: an opponent in a competitive game (separate teams, or separate individuals if the game is, say, singles-tennis).

Player Efficiency Rating (PER): an artificial metric of performance evaluation that attempts to represent the overall statistical contribution of a player, consistent with various embodiments. One example would be a particular athlete's unusual skill or demonstrably-unique characteristic that adds value to their particular contribution to the team's overall success, such as one's ability to score points efficiently and at a high volume, and would therefore be reflected via this metric. It is important to note that this metric is being used to roughly assess player talent, and consequently acts as a means of normalizing data. In various embodiments, comparable techniques that normalize for inherent talent would be used.

PER Sum, Current Season ($PER_{current}$): an artificial variable representing the sum total of the individual PER for each player currently on a given team in a given season, consistent with various embodiments.

PER Sum, Previous Season ($PER_{previous}$): an artificial variable representing the sum total of the individual PER for each player previously on a given team in a given season, consistent with various embodiments.

$player_1$ (p'): an artificial index representing the first player in a series of players on a given team, consistent with various embodiments.

$Player_n$ ('tp'): an artificial variable representing the nth player in a series of players on a given team, consistent with various embodiments.

Points. Per Game Favored (PPG Favored): an artificial variable representing the current modified average points per game attributed to the favored team, consistent with various embodiments.

Prediction: a single instance of an expected future result as created via a trial run by the program, consistent with various embodiments.

Prediction Sample (PredictionSample): a user parameter that represents the sample size of trials (each of which results in a single prediction) that the system will run before it takes the median of all predictions, consistent with various embodiments.

Relative Current Season Weight Factor (RCSW): an artificial variable that results as a combination of the Default Weight Factor and, consistent with various embodiments.

Season Average, Current (CSA): an artificial variable representing a simple average of a given consolidated team statistic over the course of the current season up to but not including a given game, consistent with various embodiments.

Season Average, Previous (PSA): an artificial variable representing a simple average of a given consolidated team statistic over the course of the previous season, consistent with various embodiments.

Season, Current (CS): an artificial variable representing the season during which a given game took place, consistent with various embodiments.

Season, Previous (PS): an artificial variable representing a season prior to the season during which a given game took place, consistent with various embodiments.

Selections Against the Spread (ATS): a calculated variable representing the number of predictions out of all predictions for each team involved in a given game that were made by the program with the spread taken into account, consistent with various embodiments.

Selections, Straight: a calculated variable representing the number of predictions out of all predictions for each team involved in a given game that were made by the program without the spread taken into account, consistent with various embodiments.

Spread: a user parameter that represents the external experimental variable against which the system will make a prediction, consistent with various embodiments.

Spread Error Bound (SpreadErrorBound): a user parameter that represents the margin for error that the user requires the system's output to deviate by in order to be considered a valid selection, consistent with various embodiments. For example, the spread for a given game predicted by the system might be required to deviate from the Oddsmaker's prediction by at least 5 percent.

Statistic Type (Stat Type): a user parameter that represents the type of statistics designated by the user as the statistics to be valued, consistent with various embodiments. For example, in a sports context, the user might designate points, rebounds and assists to be taken into consideration by the program. In a political context, the user might designate campaign finance contributions to issues like healthcare, military spending and environmental regulations to be taken into consideration by the System.

Straight Pick Against: an artificial variable representing the number of predictions out of the entire Prediction Sample that favor the opposite outcome (for example, the underdog Team winning the game) as the external metric (for example, the Spread) consistent with various embodiments.

Straight Pick For: an artificial variable representing the number of predictions out of the entire Prediction Sample that favor the same outcome (for example, the favored Team winning the game) as the external metric (for example, the Spread) consistent with various embodiments.

Various embodiments of The ARON System are described in more detail in reference to the figures. To aid understanding, drawing elements including process steps depicted by the drawing figures and flowcharts are identified by their reference numbers in a table at the end of the following detailed description.

DETAILED DESCRIPTION OF ILLUSTRATIVE EMBODIMENTS

FIG. 1 depicts a labeled flowchart of a high-level program structure for The ARON System, consistent with various embodiments. The numeric labels of FIG. 1 (1 through 9) identify the following sections, enumerated below, that provide more detailed explanations with reference to a series of flowcharts:

Section 1. Import Process
  Flowchart 1 of FIG. 2;
Section 2. Transformation Procedures
  Flowcharts 2A, 2B and 2C of FIGS. 3, 4 and 5, respectively;
Section 3. Input
  Flowchart 3 of FIG. 6;
Section 4. Conversion of Spread to GSR
  Flowchart 4 in FIG. 7;
Section 5. Algorithmic Operations
  Flowcharts 5.1, 5.2A, 5.2B, 5.2C, 5.2D, 5.3, 5.4, 5.5, 5.6, 5.7, 5.8, 5.9, 5.10, 5.11, 5.12, 5.13, and 5.14 of FIGS. 8 through 24;
Section 6. Comparison Filter
  Flowchart 6 of FIG. 25;
Section 7. Storing Interim Results
Section 8. Application of Selective Filters
  Flowchart 8 of FIG. 26; and,
Section 9. Final Determination and Output
  Flowchart 9 of FIG. 26.

In various implementations, an embodiment process may begin with exemplary data import procedures.

Section 1. Import Process

Please refer to label "1" of FIG. 1. In various embodiments, the method steps in importing raw data include the following:

(a) Import common player statistics from the most recent game;
(b) Adjust statistics based on a required minimum playing time on a per-player basis;
(c) Prepare data (the adjusted statistics) for recalculation by sending it to the appropriate structures.

Figure 2:
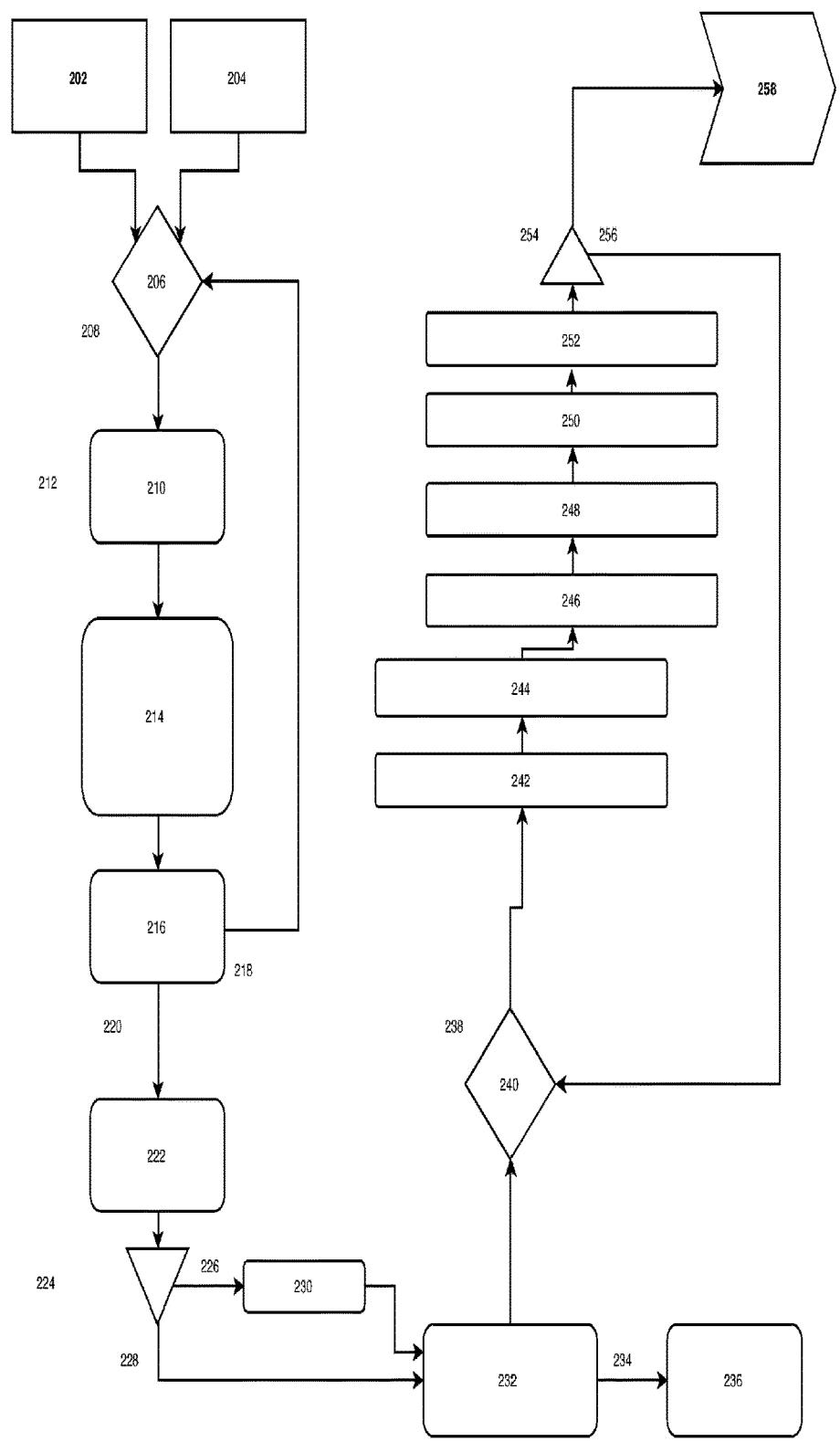
FIG. 2 depicts Flowchart 1, a flowchart for importing raw data, consistent with various embodiments.

Turning now to Flowchart 1 of FIG. 2. Flowchart 1 is a flowchart for importing raw data, consistent with various embodiments. In order for the process to function, it requires data. This data is obtained via import. This import is accomplished via a stored procedure that pulls information from a file source (with whatever frequency is necessitated by the most discrete available unit). In this case, the information is statistics on a per-team and a per-player basis, with the most discrete available unit being a game, necessitating a daily import.

(a) First, the program imports two (or more) sets of information into a holding (or staging) table, where the data waits for further processing. A staging table is a temporary table created in the database for the purpose of holding the raw imported data until it is ready to be processed further. This is the first step of Loop A.
(b) Next, common data errors are isolated by the procedure—for example, the misspelling of a certain name or word that might interfere with the successful extraction of that data at a later date.
(c) Teams are checked against the existing records to ensure that no new teams are present in the data.
(d) Should the conditions as described above via Loop A be met successfully, the procedure moves on and checks to see if there are any players present in the data that are not present in the database.
(e) Should this condition not be met, the new players are added to the database, and the procedure continues. If this condition is met, the procedure simply continues.
(f) The procedure then checks to see if the data that have been imported originates from a game that does exist in the schedule of games for that day, which the database has imported in advance. Should this not be the case, a flag is raised and the necessary adjustments may be made.
(g) The procedure then updates various application-specific tables as annotated in the flowchart with the data from the import on a per-game basis (Loop B). Here, the application is tables containing data relevant to sports betting.

With the data imported successfully, the process moves on to Step 2, the Transformation Procedures.

Section 2. Transformation Procedures

Please refer back to labels "2a" and "2a" of FIG. 1. In various embodiments, the method steps in transforming raw data include the following:

(a) Calculate PER for all players (see 2a of FIG. 1). In an illustrative example, this is akin to calculating an efficiency metric to be used in later adjustment. For example, one specific example of a PER calculation would be: for a player who averaged more than, say, 15 minutes per game, their stats would be fed into the standard formula for calculating PER. Then, this player's PER is summed together with the rest of the players currently on his/her team to calculate an artificial team PER for the current season. This is then compared to the true sum of the PER from the previous season for all the players on that team's roster, which is used to determine the extent to which the current roster differs from the previous roster, and therefore the rate of change by which that team's statistics will be adjusted throughout the season (this is accomplished by modifying the Default Weight Factor);
(b) Determine the current and previous season and the two teams involved in a given game; and
(c) Recalculate the overall statistical averages for each team going into the next game (see 2b of FIG. 2):
  (i) This process uses several artificial variables: Relative Current Season Weight Factor, the Previous and Current Season Averages, the Default Weight Factor, and the Previous and Current Season PER Sums. Cumulatively, these variables are expressed via the following equation:

$$FA = PSA(1 - RCSWF) + CSA(RCSWF)$$

Where: FA: Final Average
PSA: Previous Season Average

CSA: Current Season Average

RCSWF: Relative Current Season Weight Factor:

The previous season average (PSA) is the simple average of a given consolidated team statistic over the course of the previous season. The previous season average (CSA) is the simple average of a given consolidated team statistic over the course of the current season up to but not including a given game.

The methods of consolidation are more fully explained further below in reference to FIG. 3 (Flowchart 2A), FIG. 4 (Flowchart 2B), and FIG. 5 (Flowchart 2C).

The Relative Current Season Weight Factor is calculated as follows:

$$RCSWF=DWF+|(CS-PS)/PS|$$

(Throughout the instant disclosure, represents the absolute value)

Where: DWF: Default Weight Factor

CS and PS are calculated as follows:

$$CS=\Sigma p=1 \rightarrow tp(PER_{Current})$$

$$PS=\Sigma p=1 \rightarrow tp(PER_{Previous})$$

Where p=player$_1$ and tp=Player$_n$

One example of a Default Weight Factor would be, for example, ¼—this amount represents the baseline starting weight to be modified by the PER calculation when adjusting each teams' statistics for the current season.

In another example, at the start of the season, the default weight factor for the current season is ⅔ and the default weight factor for the previous season is ⅓. With each game in the season, the default weight of the previous season is reduced while the default weight of the current season is increased. These change at a rate inversely identical to each other that is determined by an arbitrary cap placed on the Xth game of the season. The rate of change proceeds at a pace of 1/(3*X), incrementing each step with each consecutive game. The procedure then updates the table to match.

After the data is imported, it must be normalized before further operations are conducted. At this stage, user-tailorable settings that affect the operation of the process include the required minimum value needed to calculate the PER for a given player on a per-season basis, and a variable called the Default Weight Factor, which was discussed in this section above. These settings are dependent on the context in which this program is being applied; for instance, PER would not be used when analyzing the stock market, but perhaps another artificial metric of performance evaluation might. In the case of PER, this value varies depending on whether or not the season in question is a playoff season or a regular season. Turning now to Flowchart 2A of FIG. 3, Flowchart 2A is a flowchart for the initial normalization of raw data, consistent with various embodiments. Loop A begins at this point, and the following steps are conducted on a per-game basis:

a) The PER for the current season and previous season are then summed on a per-season basis. These values are incorporated into the Regular Current Season Weight Factor together with the relevant Default Weight Factor. The specifics of this process are also described in this section above. However, what is important here is that the process is modifying the data so that it might be operated on by algorithmic operations in the most appropriate context—in other words, there are certain application-specific factors that must be accounted for prior to running an evolution-style simulation on future outcomes, and this System takes care of that.

Turning now to Flowchart 2B of FIG. 4, Flowchart 2B is a flowchart for the calculation of modified averages, consistent with various embodiments. The following steps may be conducted on a per-game basis:

b) With the simple player and team statistics (or the simple voter and precinct statistics, etc) now in place, the System can proceeds to calculating the advanced statistics, which vary by application.

c) Once these are calculated, the program identifies the type of season associated with the game in question (or the type of market, or the type of county, and so on and so forth depending on the application). In this context, were the game to be included in a playoff season, the program would create a "virtual roster" of players who were in both the current season's and the previous season's playoffs. This identification and delineation is necessary because later algorithmic operations are applied with the assumption that past data is generated via the same methods as the current data for the instance to be predicted—in this example, the assumption is that the games were played the same way in the recent past as they were yesterday. However, this is not the case when it comes to the playoffs—games played in the regular season do not reflect the strategies that are used by teams in the playoffs (thereby rendering regular season games unable to be used to predict playoff games), and furthermore team composition varies significantly from playoff season to playoff season, thus necessitating the concept of "virtual rosters". In a nutshell, this allows the later algorithmic operations to be run using data that is appropriate for generating accurate predictions.

d) Having identified the teams involved in the given game for the given season type, the process consolidates the player stats into team stats via a designated mathematical method that is applied to all stats equally—for example, one could sum the stats; or take the median; or multiply, divide by four, and then cube them.

e) Following this consolidation, the average of this value is taken for both the current and previous seasons.

f) As elaborated in this section above, the Relative Current Season Weight Factor is taken together with the averages calculated in the previous step to produce the first finished set of modified statistical averages.

Figure 5:
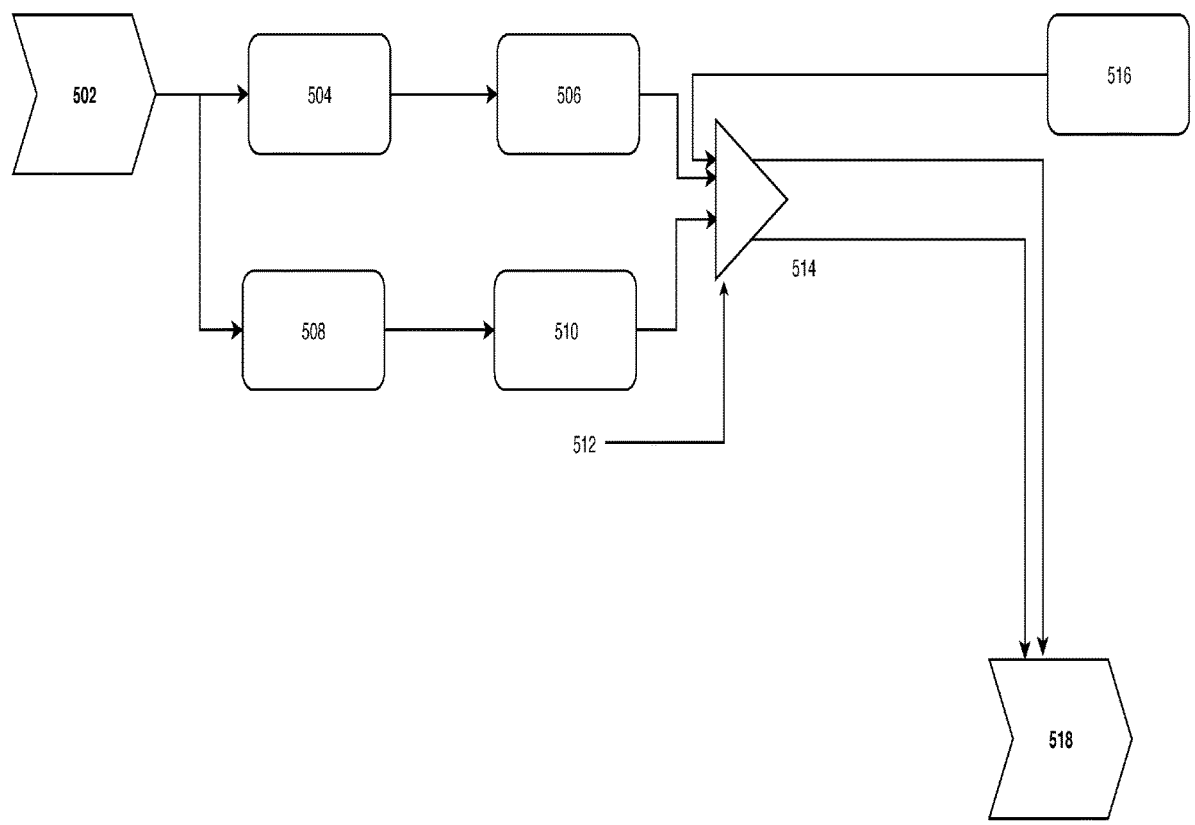
FIG. 5 depicts Flowchart 2C, a flowchart for the calculation of FTC (defined below) and comparison to FTC-Limit, consistent with various embodiments.

Turning now to Flowchart 2C of FIG. 5, Flowchart 2C is a flowchart for the calculation of FTC and comparison to FTCLimit, consistent with various embodiments. The following steps are conducted on a per-game basis:

g) At this point, a filter called FTC, or Floor Talent Change, is calculated. This is a filter just like any other, and again would vary depending on the context in which this program was being applied. In the case of FTC, the goal is to identify whether or not the data that will be used by the algorithmic operations is reliable in terms of whether or not changes in the starting lineup will affect the accuracy of the prediction—in essence, if a starter for the team recently has been out, then data prior to that starter's departure may not be accurate for predicting game results following his departure. To calculate FTC, a two sets of games (Set A, or "Previous" and Set B, or "Last") are identified, each with an equal number of games inside—Set A constitutes the X number of games directly prior to the one to be calculated, and Set B constitutes the X number of games directly prior to Set A. For each set, the PER of the starters involved in each of the games is summed. Then, the two are compared: (Previous-Last)/Previous. Should the resulting value be bigger than the FTCLimit, the game to be predicted will be flagged as having a Floor Talent Change, or FTC=1. Otherwise, FTC will=0. Here, the FTCLimit is a user-defined decimal value that is between 0 and 1, correlating to the maximum acceptable percentage by which the talent on the floor can change before the game is flagged as having potentially unreliable data. Prior to the final assessment and prediction of game results, games may be excluded due to being flagged with FTC=1 in conjunction with several other filters (many of which are discussed in this section above).

h) At this point, Loop A ends.

Returning to "End Loop A" on Flowchart 2B of FIG. 4, the following steps are conducted on a per game basis:

i) The Modified Averages are then normalized to a similar scale via a consistent and equally-applied user-defined mathematical process.

j) The user now has the option to non-linearize the normalized, modified averages prior to the data being used during algorithmic operations. This feature may be turned on or off by the user via interaction with the database.

Going into Step 3 (Input), the data is now ready to be used in ARON's algorithmic operations.

Section 3. Input (and Further DEFINITIONS of Input Parameters):

Referring back to label "3" of FIG. 1: In various embodiments, a user of the ARON System may enter the following parameters as input:

a) GameID: a user parameter that represents the game that the user would like to predict. It can also represent the target game-like scenario that a user would like to predict (including but not limited to an election outcome, a stock movement, or sports game).

b) SpreadErrorBound: a user parameter that represents the margin for error that the user requires the system's output deviate by in order to be considered a valid selection.

c) OddsmakerID: a user parameter that represents the ID of the Oddsmaker associated with the spread (or other external experimental variable).

d) Spread: a user parameter that represents the external experimental variable against which the system will make a prediction.

e) PredictionSample: a user parameter that represents the sample size of trials that the system will run before it takes the median of all predictions.

f) OfficialDesignation: a user parameter that represents the designation of the prediction as being either official (only one single prediction for the given GameID exists) or unofficial (a trial run or a debugging instance, for example).

g) AssociatedModelID: a user parameter that represents the ID of the Validation Model from which the current version of the program inherits its particular settings. A validation model is a set of retroactive predictions used to determine the accuracy and efficacy of the system.

Figure 6:
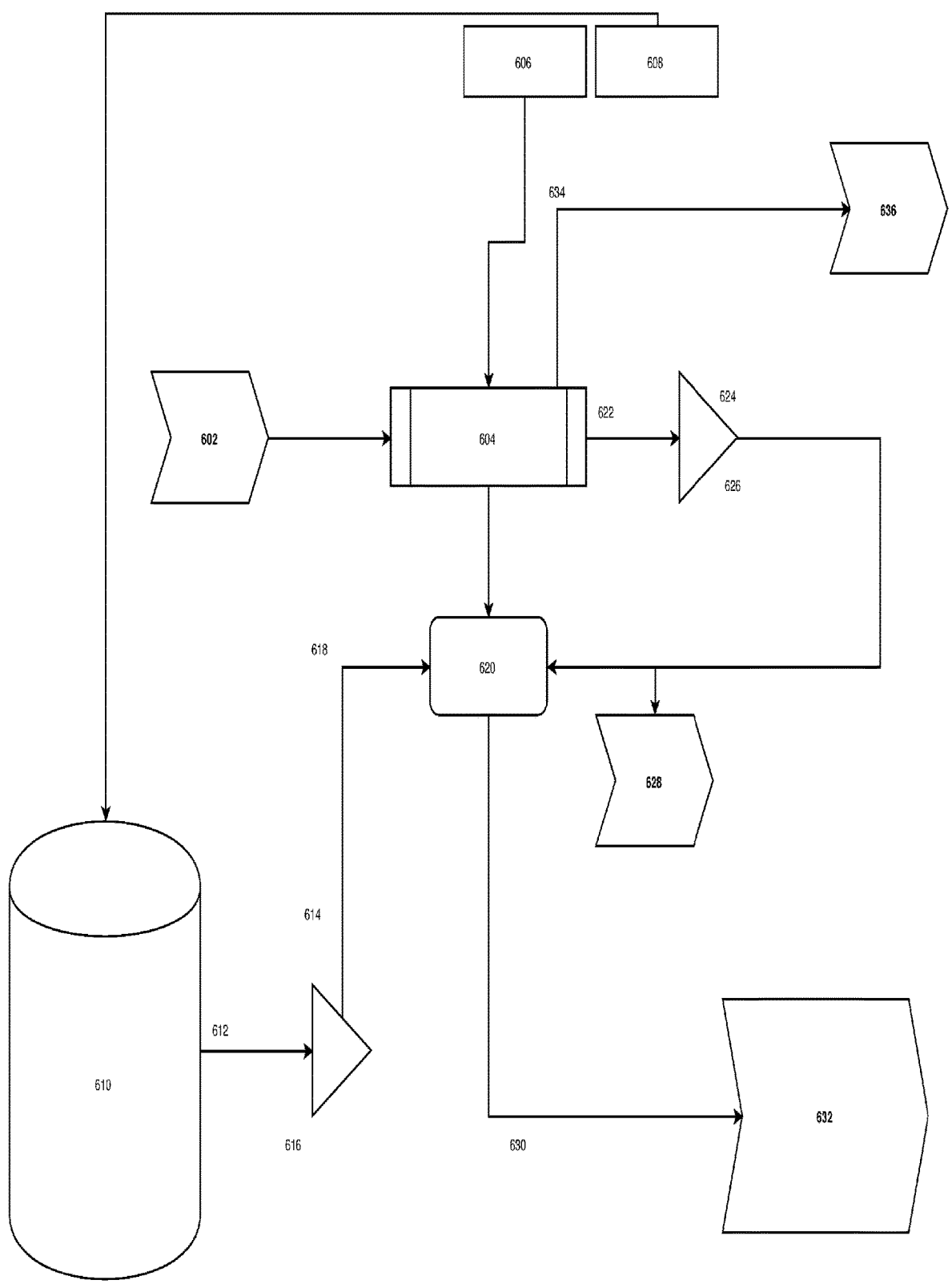
FIG. 6 depicts Flowchart 3, a flowchart for user input and game initialization, consistent with various embodiments.

Turning now to Flowchart 3 of FIG. 6. Flowchart 3 is a flowchart for user input and game initialization, consistent with various embodiments.

Were an embodiment process to be characterized as an "engine", this would be the moment it switches from neutral to high gear. Depending on the context to which ARON is applied, the user input will vary. However, with regard to this application of ARON, the user input consists of the parameters as laid out in this section above. To initialize a prediction, the process must identify which Stat Types to use as training information. It retrieves this information from the database, where the stat types to be valued have been predesignated by the user. The remaining components of this process are clearly explained and defined above.

With user input and game initialization, the System moves on to Step 4, the Conversion of Spread to GSR.

Section 4. Conversion of Spread to GSR

Please refer back to label "4" of FIG. 1. In an illustrative example, Game Spread Ratio (GSR) may be understood as an analog of the real-life integer or decimal point spread. In short, the process converts a Spread into a GSR by assessing the favorite as determined from the Spread and applying the Spread to the value that represents the favorite's average expected point total for a given game (or any other discreet instance, like an election or stock movement), ultimately producing a GSR that approximates the outcome of a game (or other discreet instance) as predicted by the Spread.

Consistent with various embodiments, GSR is calculated on a per-game basis. The calculation used to determine the GSR depends on which team is favored:

When the home team (Team 1) is favored:

GSR Upper is the numerator of the GSR, consisting of the current modified average points scored by the Home Team plus the Spread as set by the Oddsmaker, and is calculated as follows: $PPG_{Favored}$+Spread; where $PPG_{Favored}$ is the current modified average points per game being scored by a given team at the time of the prediction of a given game, and is calculated via the same procedure used to calculate all other modified statistical averages as disclosed herein, and as illustrated by FIGS. 3 and 4.

GSR Lower is the denominator of the GSR, consisting of the current modified average points scored by the Home Team and is equal to $PPG_{Favored}$.

GSR is calculated as follows: $(PPG_{Favored}+\text{Spread})/PPG_{Favored}$

When the away team (Team 2) is favored:

GSR Upper is equal to $PPG_{Favored}$

GSR Lower is calculated as follows: $(PPG_{Favored}+\text{Spread})$

GSR is calculated as follows: $PPG_{Favored}/(PPG_{Favored}+\text{Spread})$

It follows, then, that a GSR greater than one indicates the Home Team is favored, while a GSR that is less than one indicates that the Away Team is favored.

Figure 7:
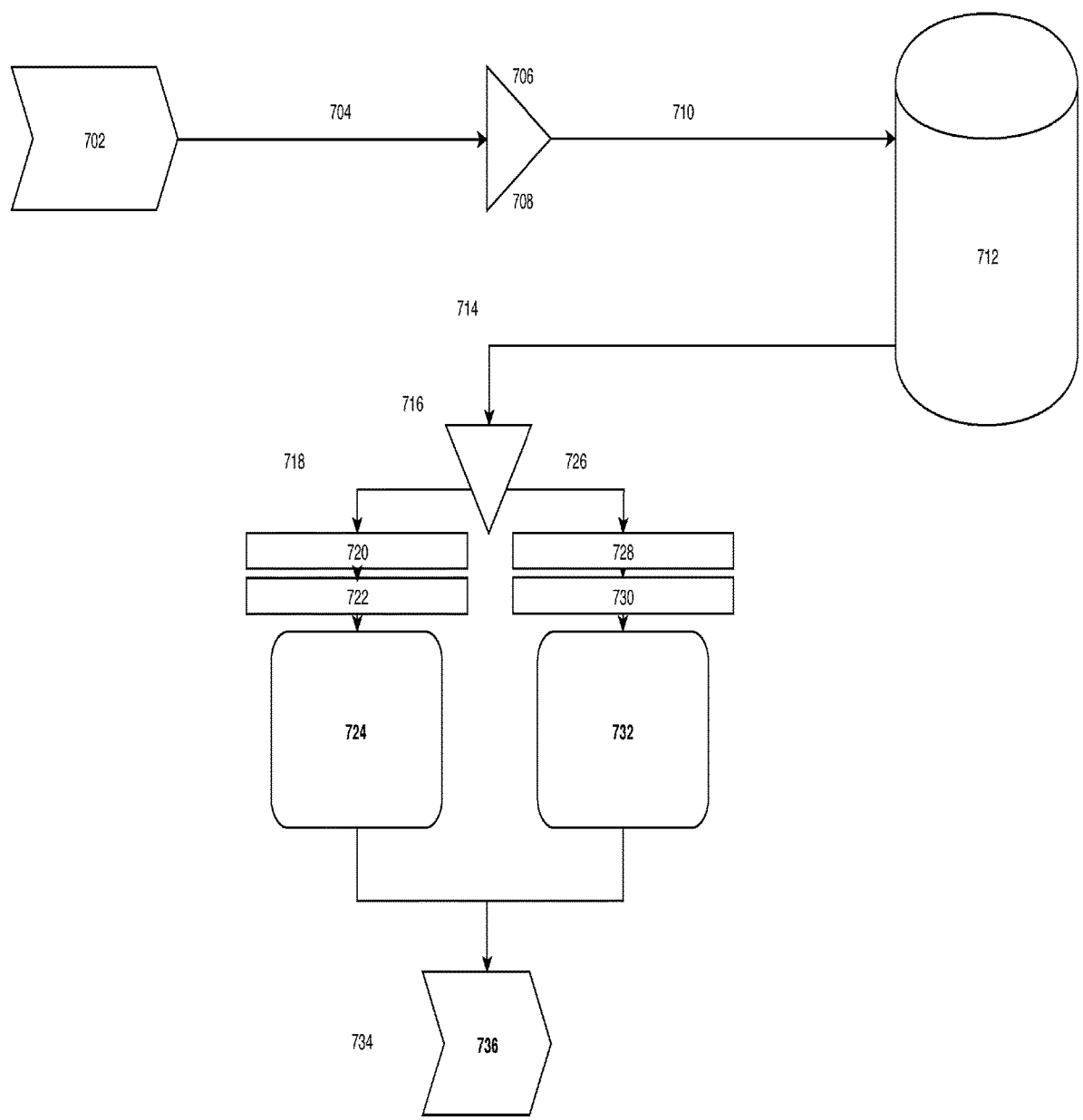
FIG. 7 depicts Flowchart 4, a flowchart for the transformation of the Spread into the GSR, consistent with various embodiments.
Figure 8:
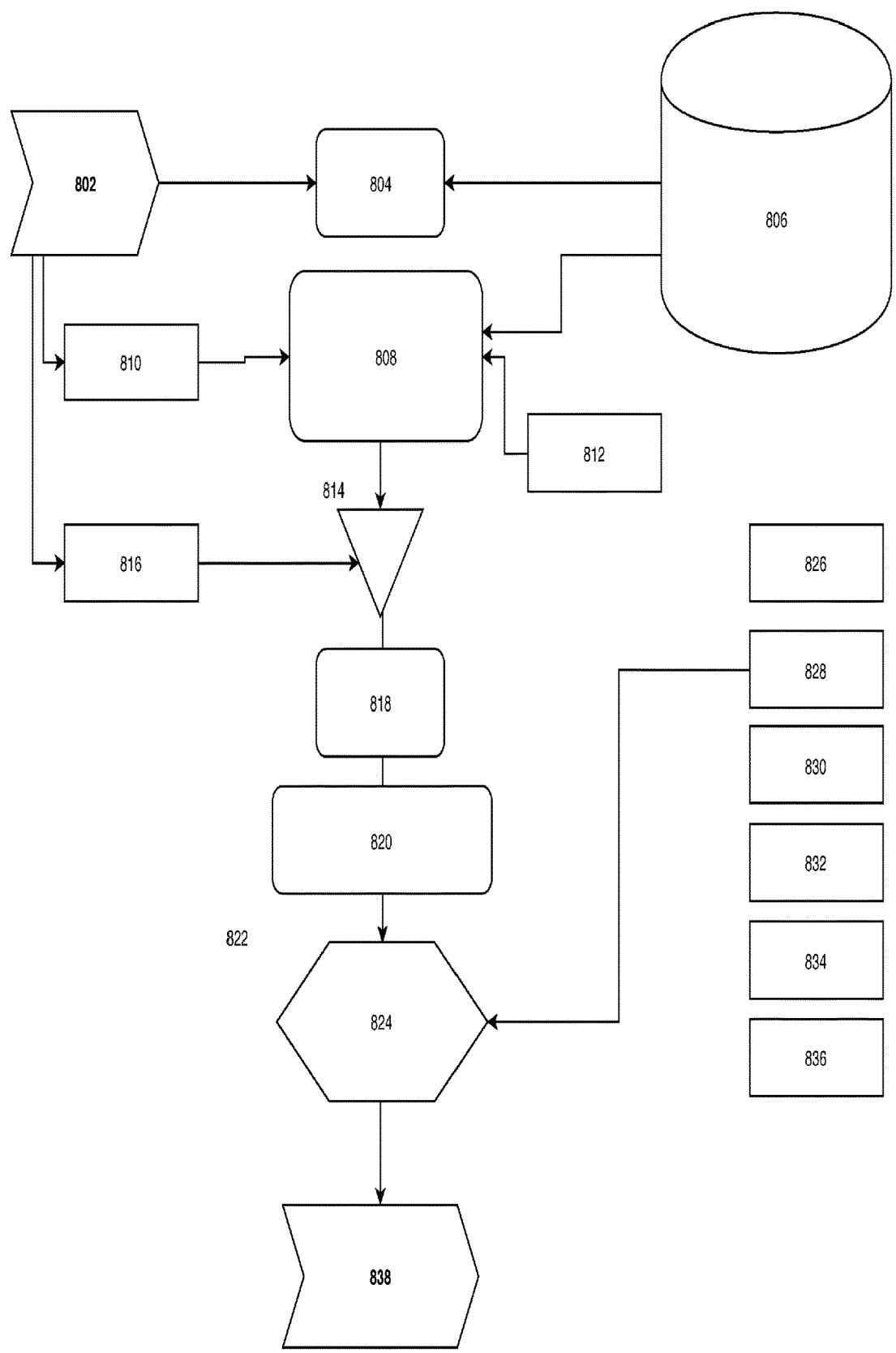
FIG. 8 depicts Flowchart 5.1, a flowchart of a process in algorithmic operations—Initialization, consistent with various embodiments.
Figure 9:
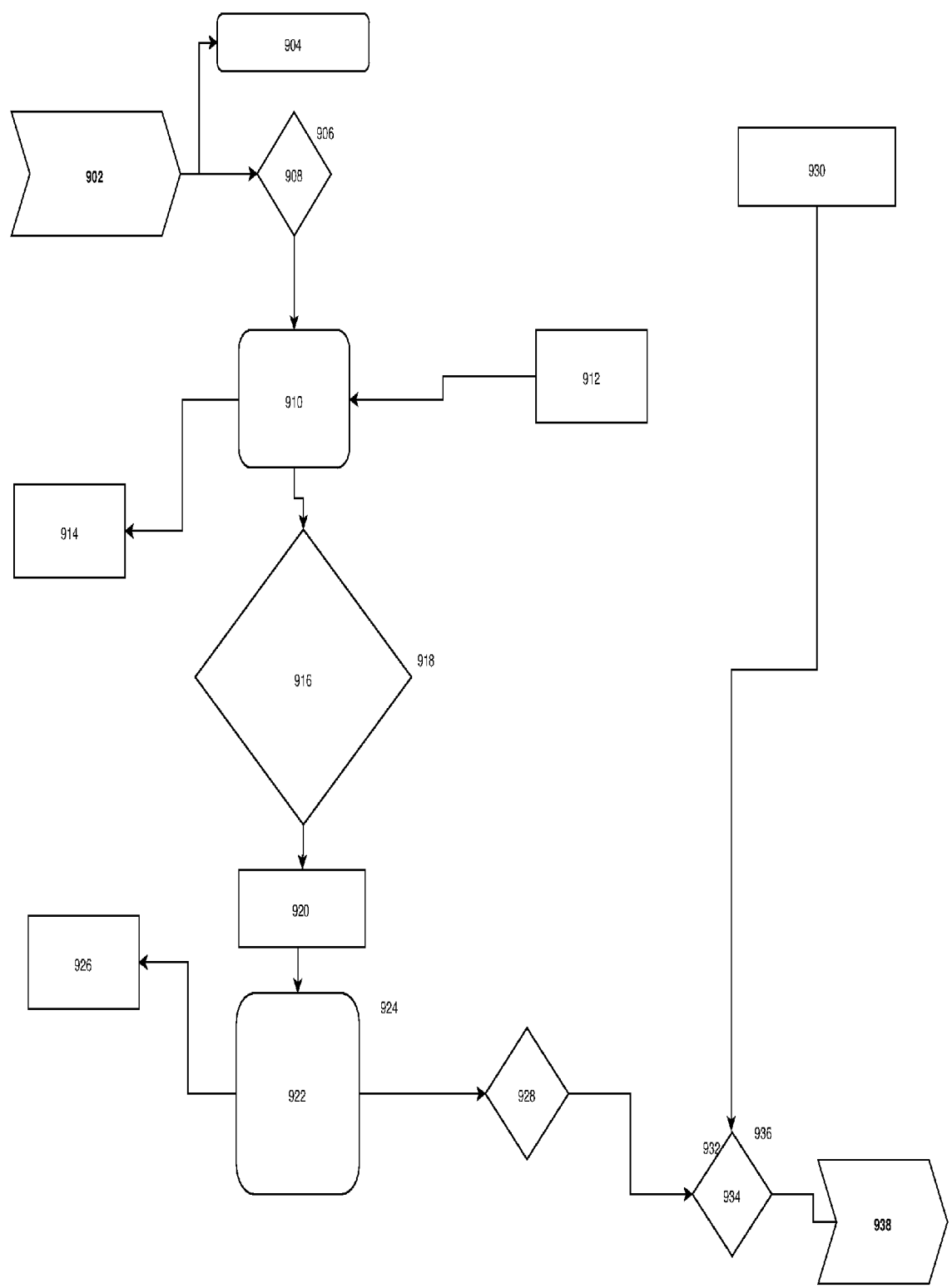
FIG. 9 depicts Flowchart 5.2A, a flowchart of a process in algorithmic operations—Prediction Driver, consistent with various embodiments.
Figure 10:
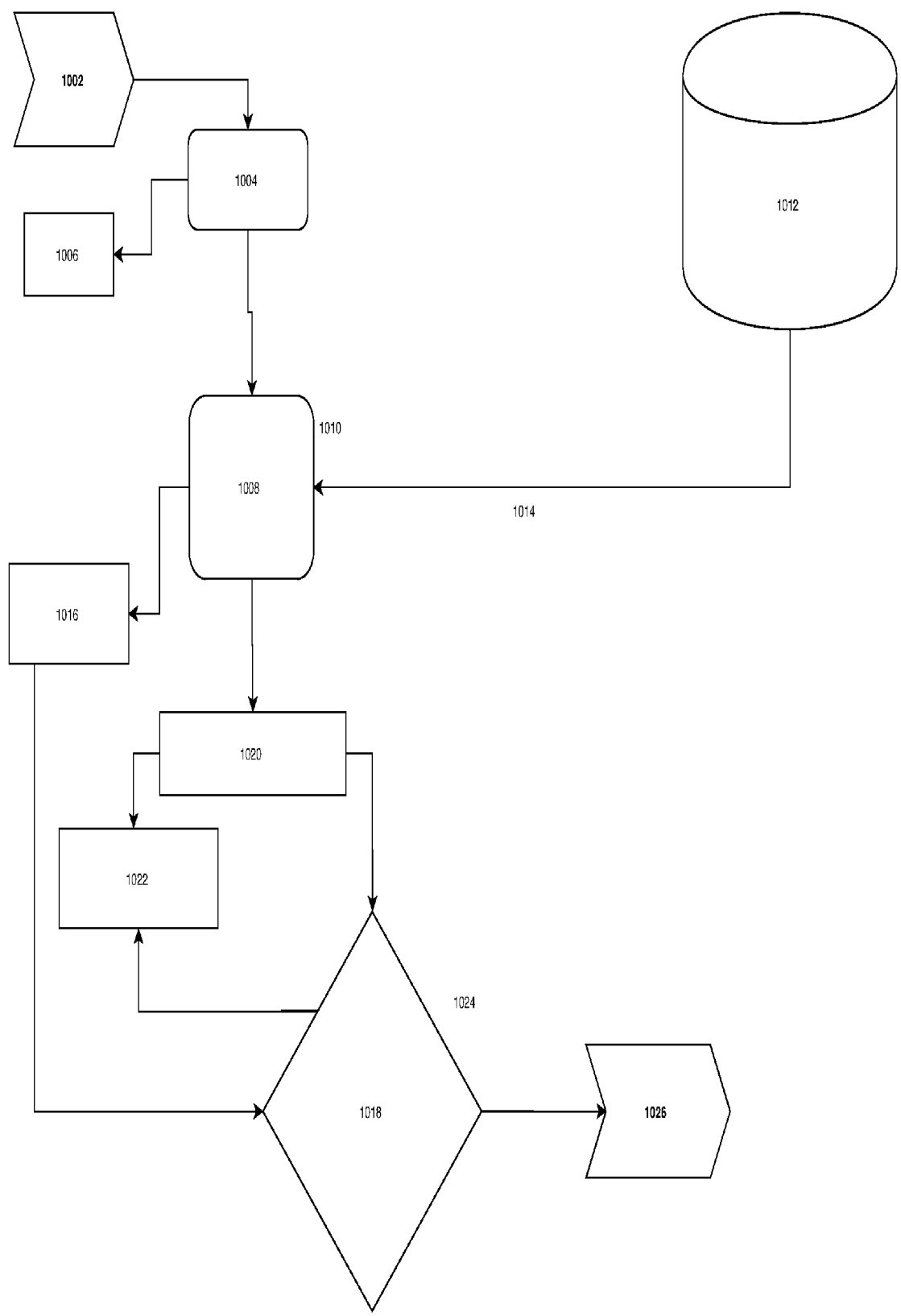
FIG. 10 depicts Flowchart 5.2B, a flowchart of a process in algorithmic operations—Prediction Driver, consistent with various embodiments.
Figure 11:
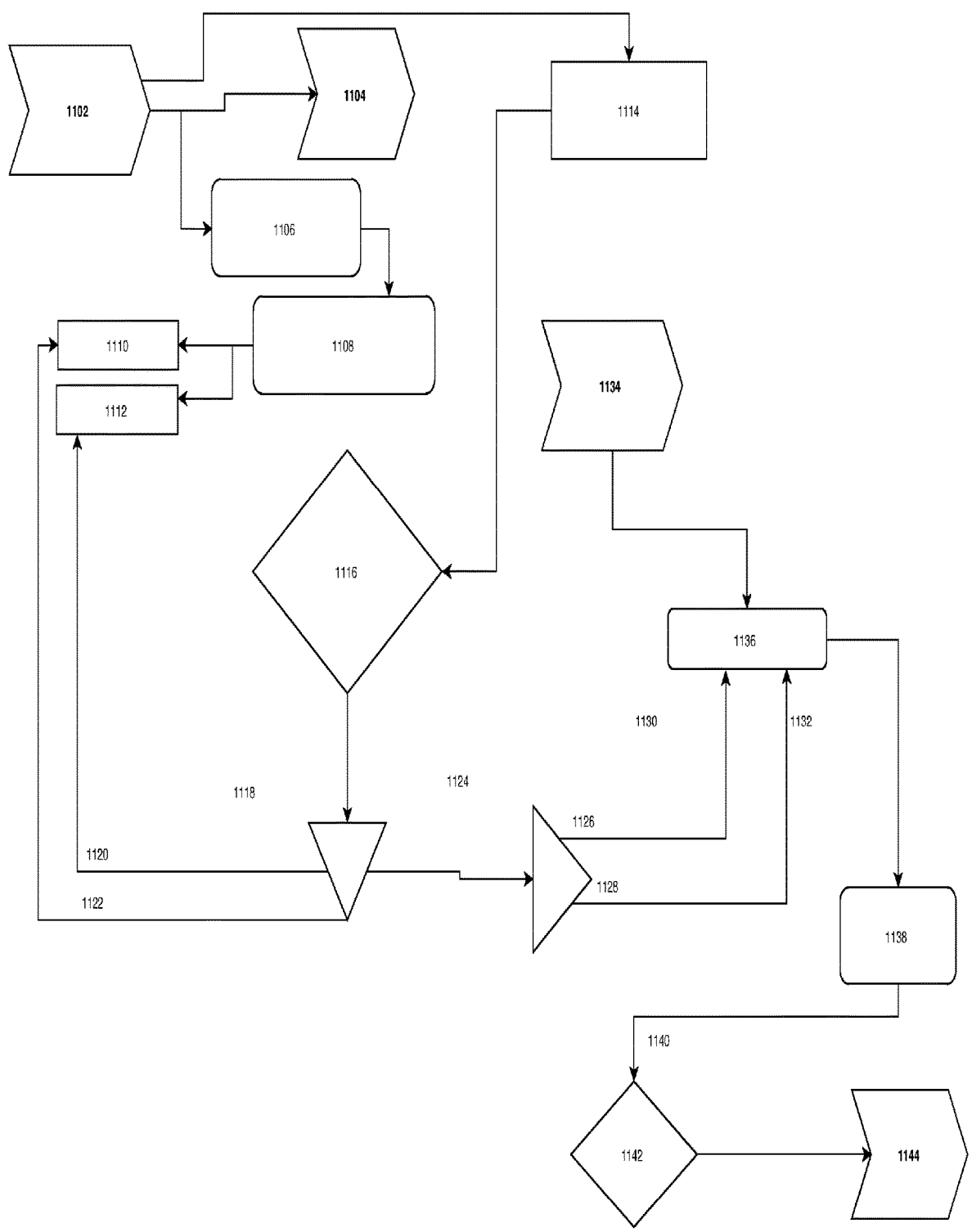
FIG. 11 depicts Flowchart 5.2C, a flowchart of a process in algorithmic operations—Prediction Driver, consistent with various embodiments.
Figure 12:
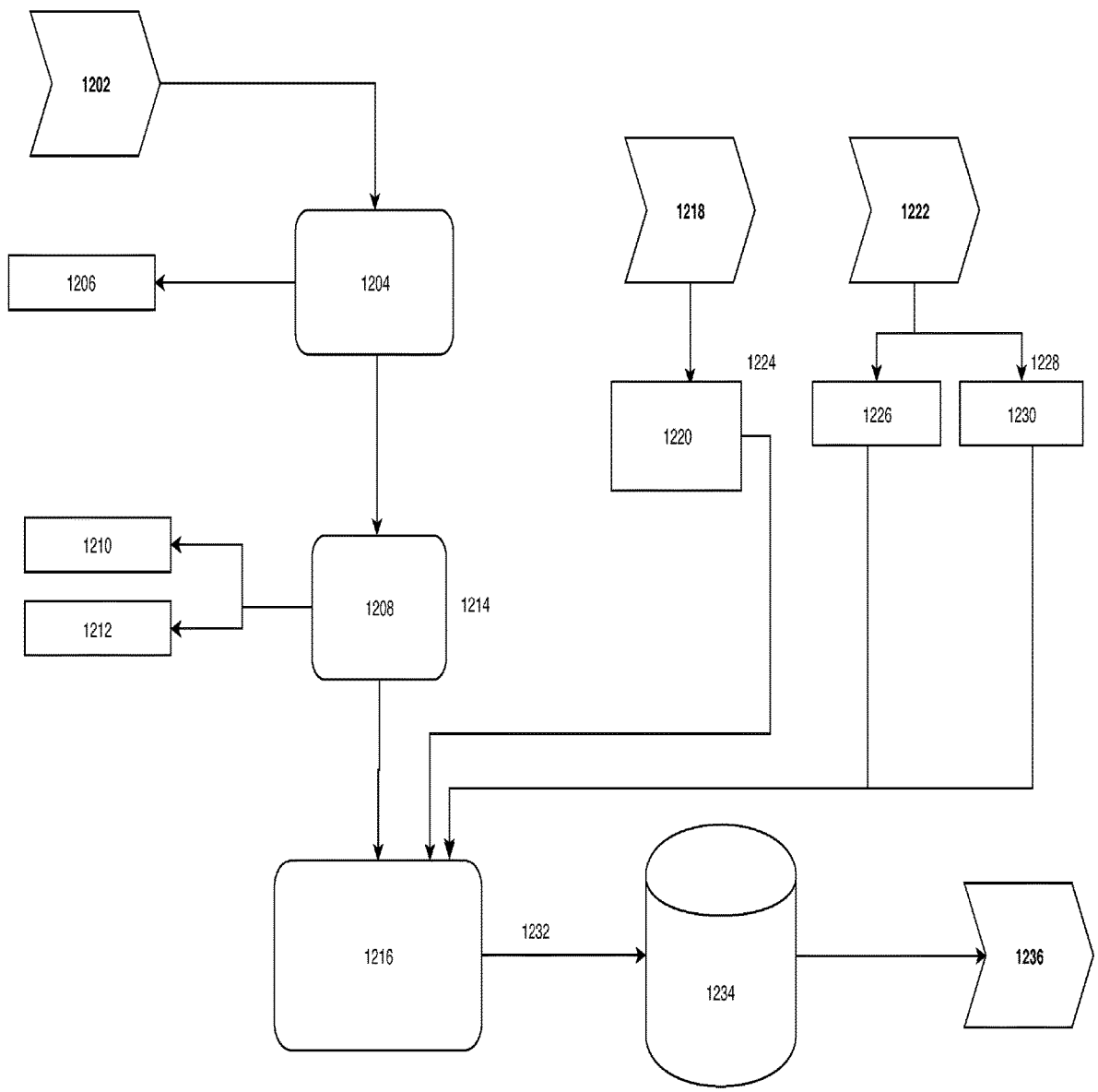
FIG. 12 depicts Flowchart 5.2D, a flowchart of a process in algorithmic operations—Prediction Driver, consistent with various embodiments.
Figure 13:
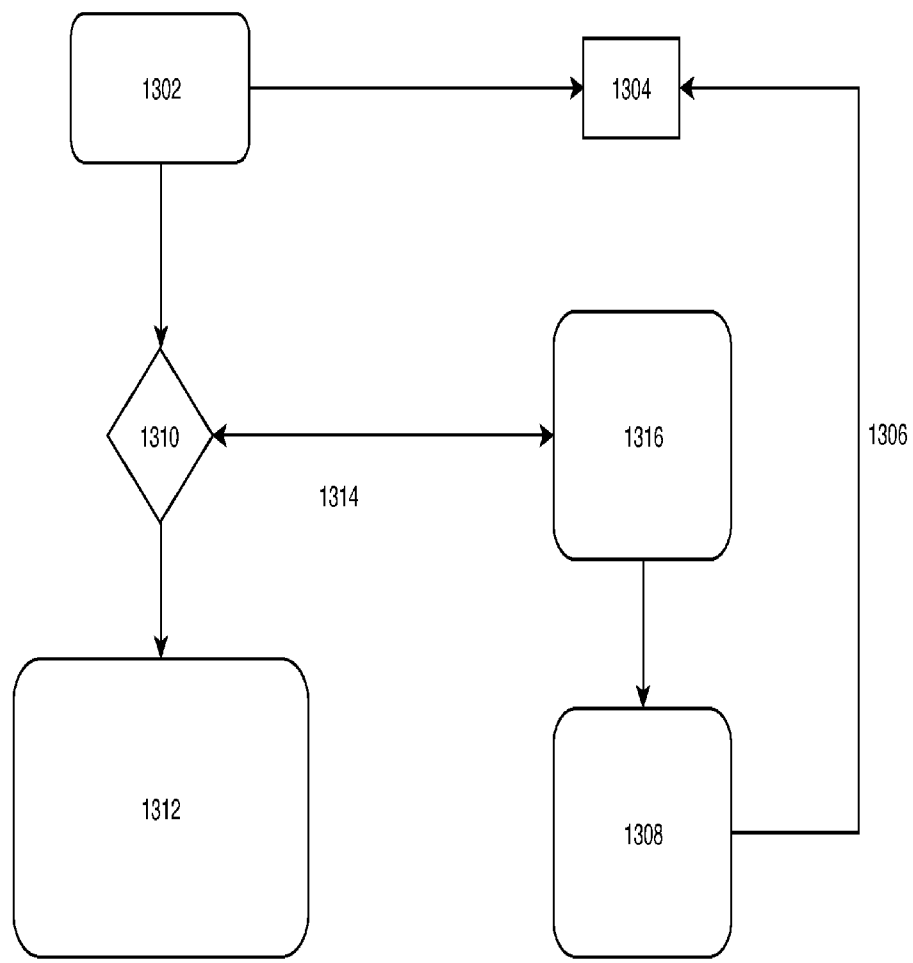
FIG. 13 depicts Flowchart 5.3, a flowchart of a process in algorithmic operations—Make Start Gen, consistent with various embodiments.
Figure 14:
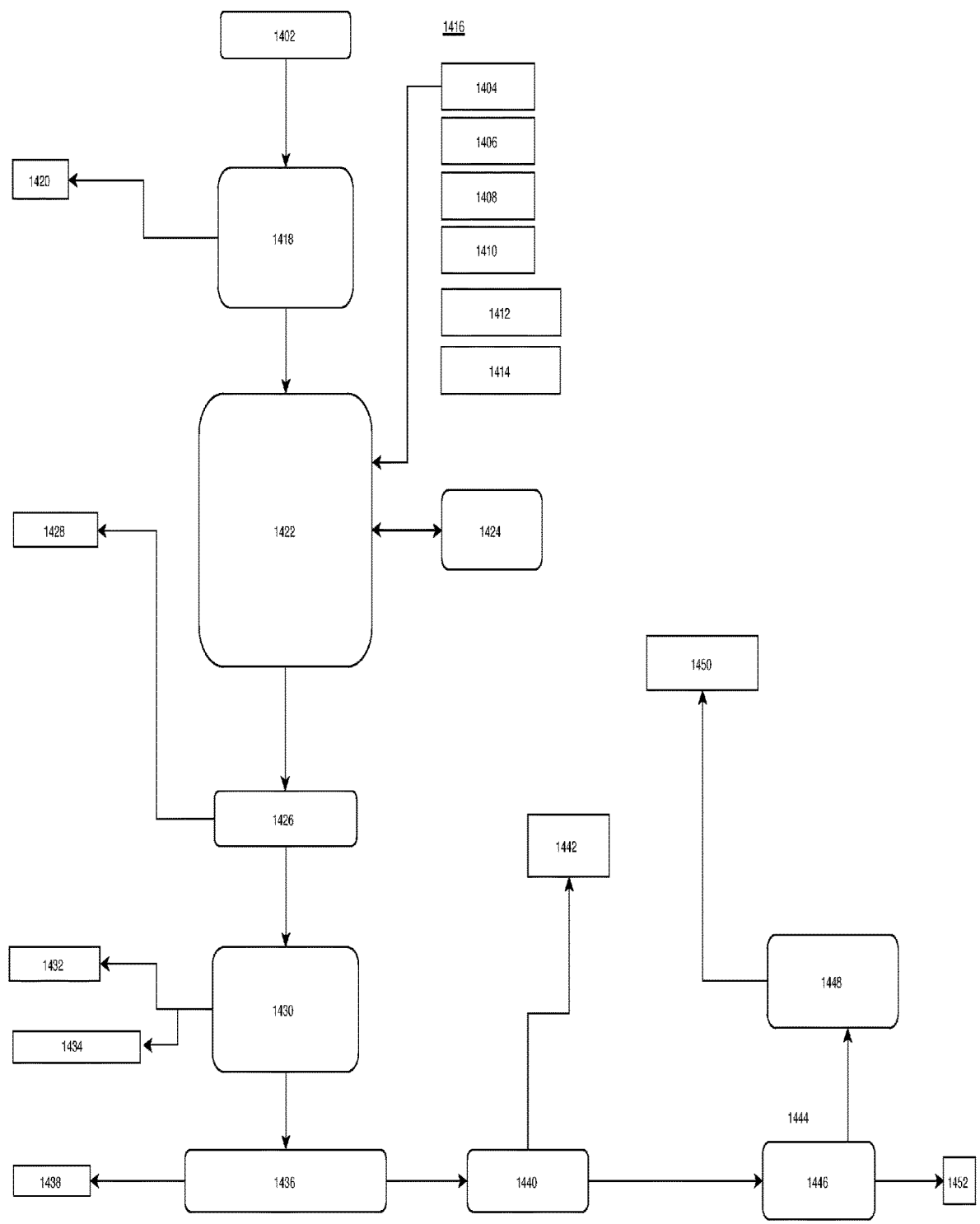
FIG. 14 depicts Flowchart 5.4, a flowchart of a process in algorithmic operations—class Sim init_:, consistent with various embodiments.
Figure 15:
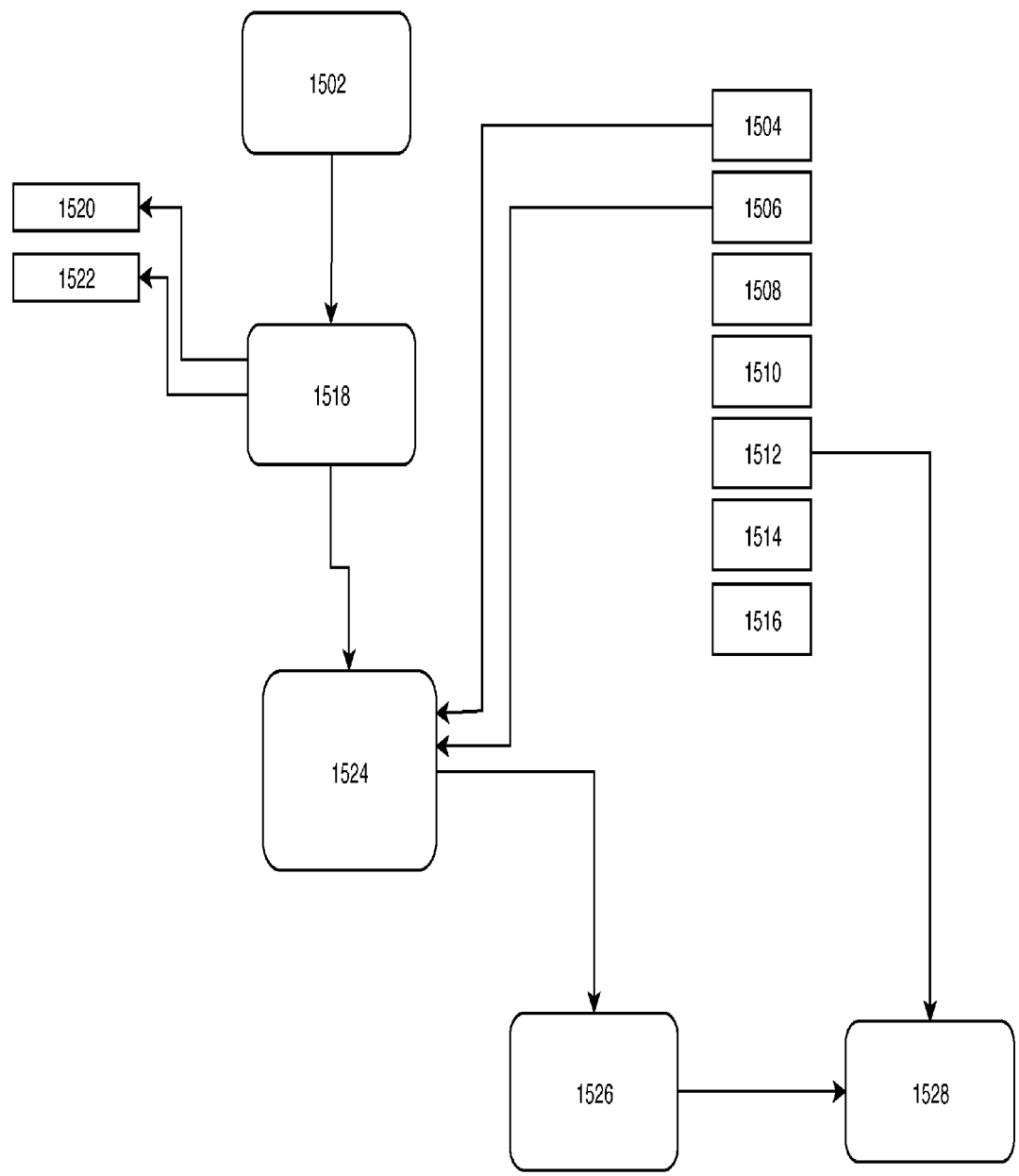
FIG. 15 depicts Flowchart 5.5, a flowchart of a process in algorithmic operations—class Game init_:, consistent with various embodiments.
Figure 16:
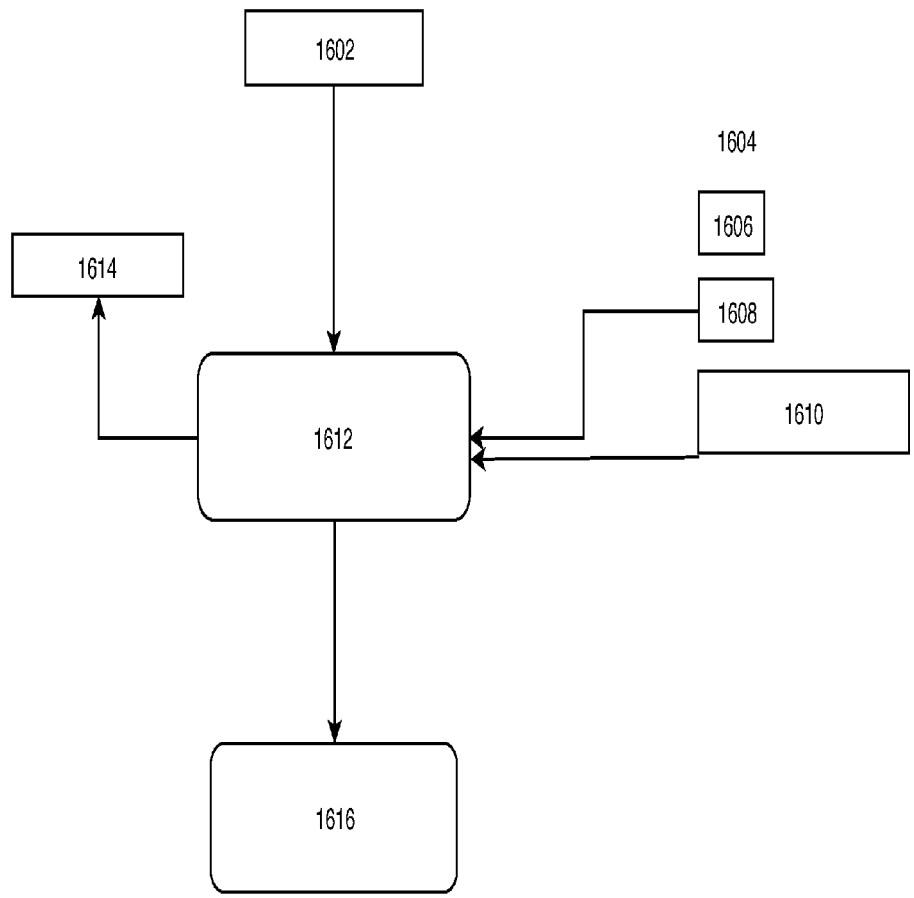
FIG. 16 depicts Flowchart 5.6, a flowchart of a process in algorithmic operations—Creation Method (Randomized Version without Crossover), consistent with various embodiments.
Figure 17:
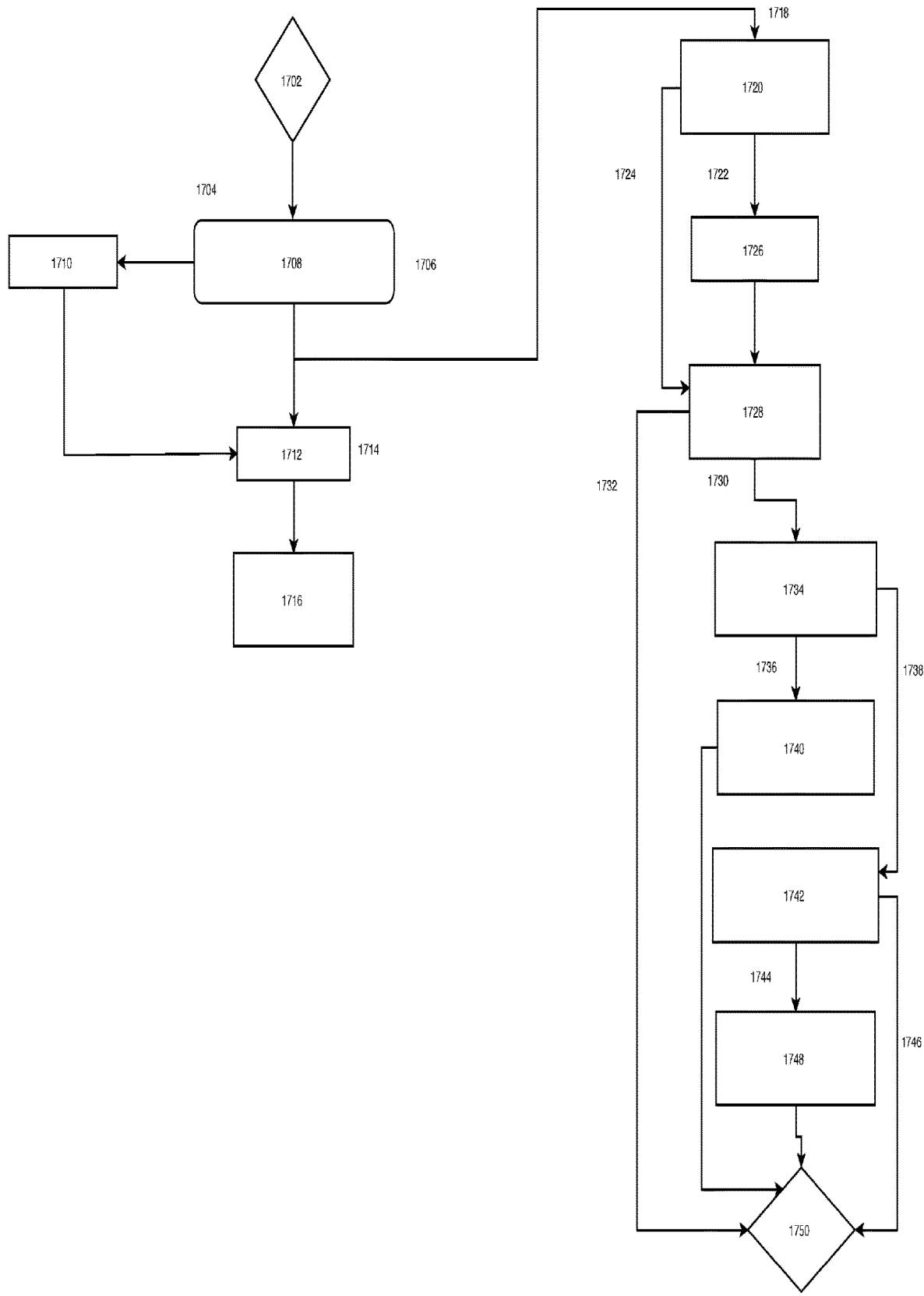
FIG. 17 depicts Flowchart 5.7, a flowchart of a process in algorithmic operations—Loop B, consistent with various embodiments.
Figure 18:
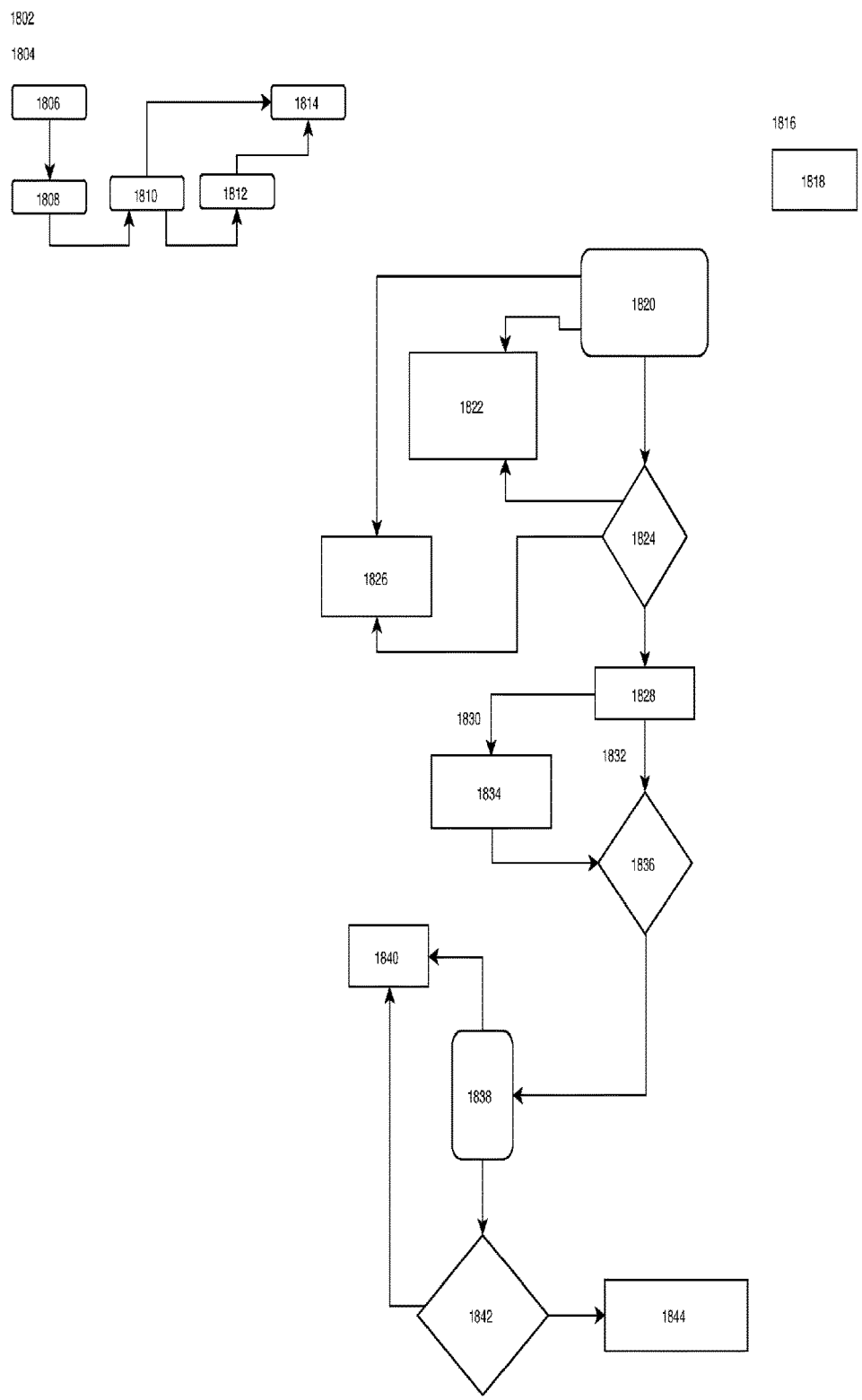
FIG. 18 depicts Flowchart 5.8, a flowchart of a process in algorithmic operations—class Sim Method: SimGen (see Algorithmic Operations Interface section), consistent with various embodiments.
Figure 19:
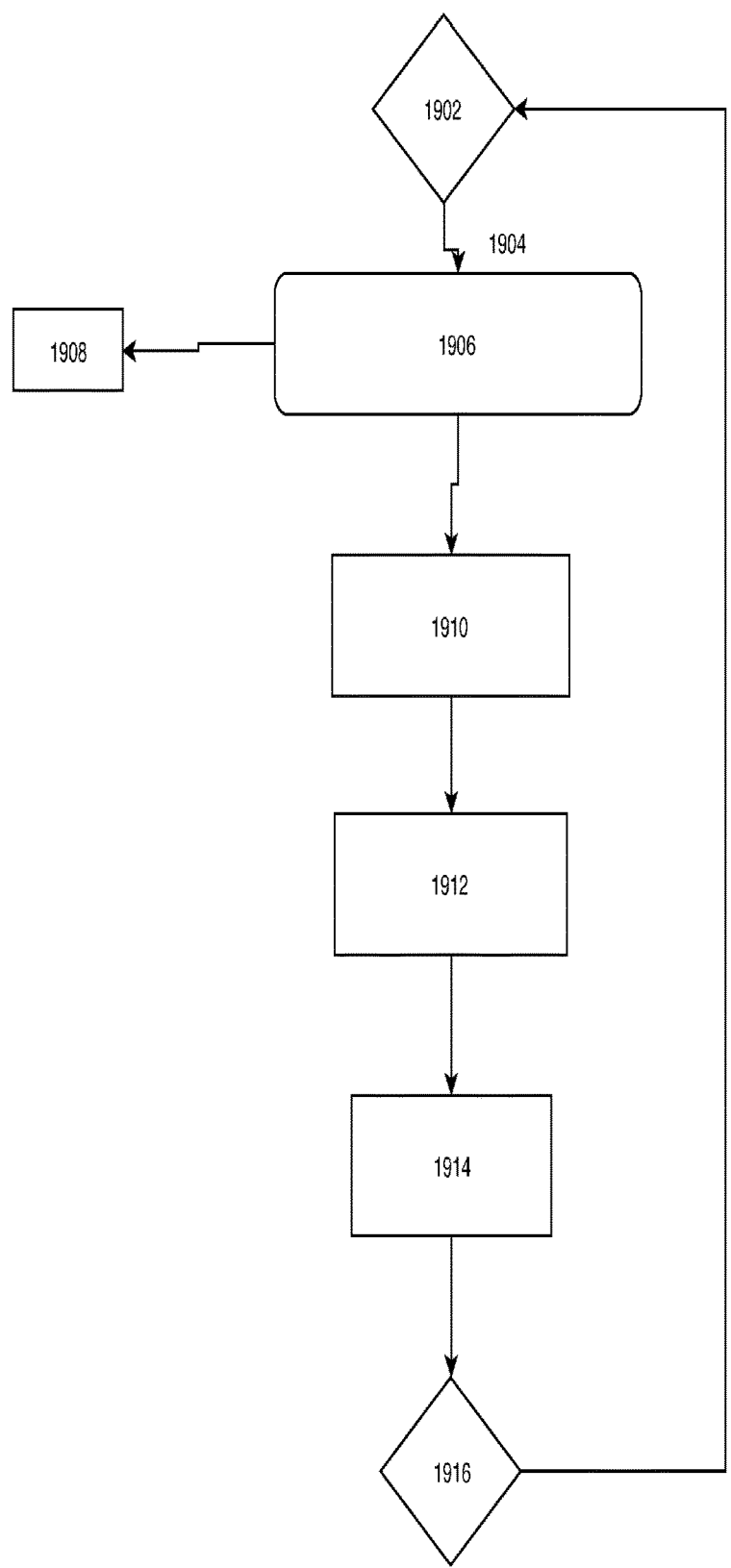
FIG. 19 depicts Flowchart 5.9, a flowchart of a process in algorithmic operations—Loop C, consistent with various embodiments.
Figure 20:
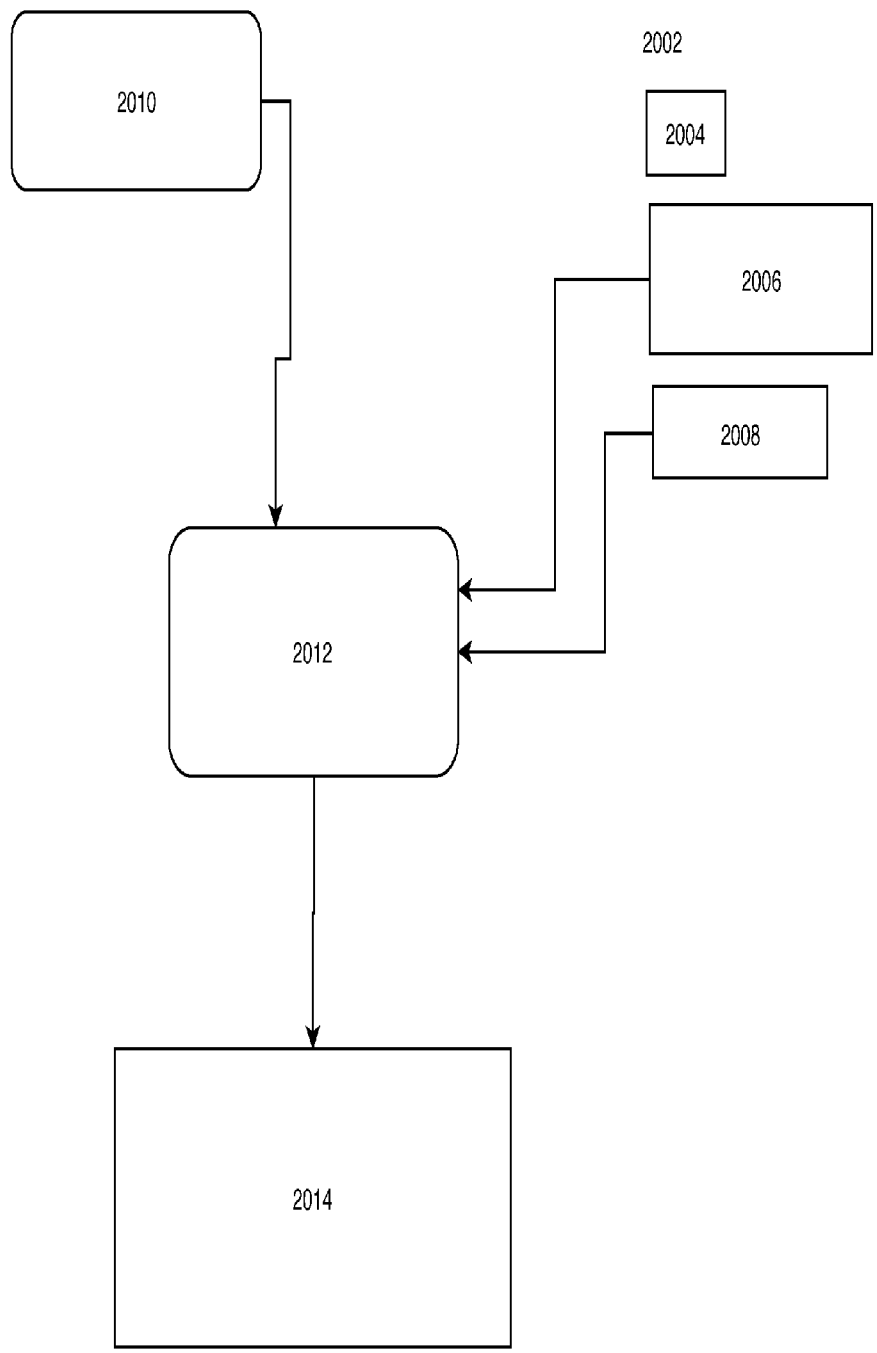
FIG. 20 depicts Flowchart 5.10, a flowchart of a process in algorithmic operations—class Model Method: Predict, consistent with various embodiments.

Turning now to Flowchart 4 of FIG. 7. Flowchart 4 is a flowchart for the transformation of the Spread into the GSR, consistent with various embodiments.

The contextually specific details of this transformation are described in this section above. Further explanation of the discrete logical steps would prove redundant, as Flowchart 4 itself annotates all the decisions that the process makes in straightforward terms. However, it is important to recognize that a similar transformation might be applied in the context of predicting other game-like scenarios—for instance, political elections or stock futures. In essence, Step 4 represents the process's ability to take in the defining external metric against which success or failure is measured and transform it into a value that can be utilized effectively by an evolutionary-style algorithm-based System.

With Spread converted to GSR, the process moves on to Step 5, the Algorithmic Operations.

Section 5. Algorithmic Operations

Before providing further detail on the process's operations of its new and heavily-modified genetic algorithm, the following is a brief overview of standard prior art genetic algorithms. A standard prior art genetic algorithm is an artificial intelligence construct that solves nonlinear optimization problems by simulating evolution. A finite population (or set of solutions) is randomly created where each organism has a genetic makeup that represents a single point in the sample space. The sample space is traversed primarily through the use of three operations inspired by Darwin's theory of evolution: mutation, selection, and crossover. If all three of these operations are well implemented the program will traverse the sample space and converge to a global solution. The randomness of a genetic algorithm allows it traverse very large sample spaces in a computationally feasible amount of time. The evolutionary operators lead to a metaheuristic approach that avoids pitfalls of common optimization algorithms such as non-linearity, outlier data, and convergence to local solutions.

In various embodiment implementations, ARON provides a new modification to, and implementation of, a standard genetic algorithm. A genetic algorithm functions as a template where the programmer is meant to tailor the settings, sample space, and certain implementation details to fit his/her specific optimization problem. In this sense, the ARON System applies a novel implementation of a genetic algorithm through its extensive testing to optimize such settings such as population size, number of iterations to convergence, mutation chance, and provide a high dimensional feature space that can be non-linearly optimized using neural network architecture in the gene composition of the genetic algorithm.

More significantly, in various embodiments, ARON modifies the overall genetic algorithm structure for the purpose of improved predictions of game-like scenarios. In prior art implementations of genetic algorithms, the constructed environment is static; that is to say, the metric for assessing fitness is constant throughout the simulation. Fundamental to ARON is a dynamic environment which insures that the number of iterations is such that the evolutionary operators have the optimal amount of freedom to traverse a large enough subset of the sample space without converging to local maxima. ARON alters the algorithmic operations on the fly by self-analyzing its own metric for fitness and by determining whether it is converging to a local maxima. Due to this process, the ARON System never runs the same way twice. Additionally, various embodiments of ARON's new implementation of neural network architecture as the solution design and predictive procedure in the genetic algorithm provides for high dimensional augmentation of the sample space as well as the ability to discern non-linear solutions, avoiding a pitfall of prior art genetic algorithms.

Please now refer back to "5a," "5b," and "5c" of FIG. 1.

At 5a of FIG. 1, consistent with various embodiments, the algorithm takes in, as parameters, the numerator and denominator of the calculated Game Spread Ratio (GSR), together with the current weight range parameters, custom settings, and the current stats for each of the two teams involved, current up to but not including the game to be predicted, consistent with various embodiments. One example of a weight parameter setting would be the interval of all real numbers between −1 and 1. The algorithm then retrieves information from the database in an effort to better tailor the approach to the game at hand. In this case, it retrieves the last X number of games played between the two given teams involved in the current game, which in some examples may be identified by a GameID, along with the pertinent, associated statistics for those games.

At 5b of FIG. 1, consistent with various embodiments, the algorithm runs on the level of generations, models, and games, and operates as follows:

(a) Initialization
  (i) The process takes in modified game stats;
  (ii) The stat types designated by the user together with mathematical transformations into prespecified higher dimensional spaces are used to create an ultra-high dimensional sample space. In an example illustrative of various preferred embodiments' design and usage, this sample space may contain over $10^{23}$ points; and
  (iii) The process creates an initial population created from random points in the sample space.
(b) Selection & Definitions of the Selection Sub-Processes:
  (i) Each member of the population is assessed for fitness by predicting games from the previous seasons and comparing the member's prediction to the real-life outcome of the game;
  (ii) The members of the population that exceeded a dynamically defined standard for success are designated as members of the parent generation which will be used to create the next generation (at 5c of FIG. 1); and
  (iii) The parent generation is filled with more random organisms to make up for the ones that didn't meet the standard, therein bringing new data points from the sample space into consideration.
(c) Crossover
  (i) Each member of the next generation is created pseudo-randomly from two members of the parent generation.
(d) Mutate
  (i) During this process, a gene in the genetic algorithm represents one element in one weight transformation matrix or vector. During mutation, each gene has a small chance of mutation which changes that gene to a random number. This process iterates until the algorithm decides that a satisfactory solution has been reached;
  (ii) At this point, the solutions have converged on a global maxima—a solution that is optimal for predicting all the games that were used to train the algorithm. This solution is used to make a distributed set of predictions for the given game to be predicted.
  (iii) This entire process is repeated a user-specified number of times to form a distribution and the median of this distribution taken as output.

Turning now to Flowcharts 5.1, 5.2A, 5.2B, 5.2C, 5.2D, 5.3, 5.4, 5.5, 5.6, 5.7, 5.8, 5.9, 5.10, 5.11, 5.12, 5.13, 5.14 of FIGS. 8 through 24, this series of flowcharts documents the logic behind each decision that the algorithm makes, consistent with various embodiments. An exemplary Algorithmic Operations Interface description later in this detailed description provides documentation for the various classes and methods used during algorithmic operations as referenced in Flowcharts 5.1 through 5.14 and as they are represented in FIGS. 8 through 24.

The following series of flowcharts reference other processes that are occurring as part of the algorithmic system's operations. Much like in the case of Step 4, further explanation of these basic logic steps would prove largely redundant, as all logical steps are annotated in the Series 5 Flowcharts. As such, further clarification of additional terminology is herein provided. For example, "Predict" as indicated at the top of several of the Series 5 Flowcharts references the original file name in which these operations are written.

Figure 21:
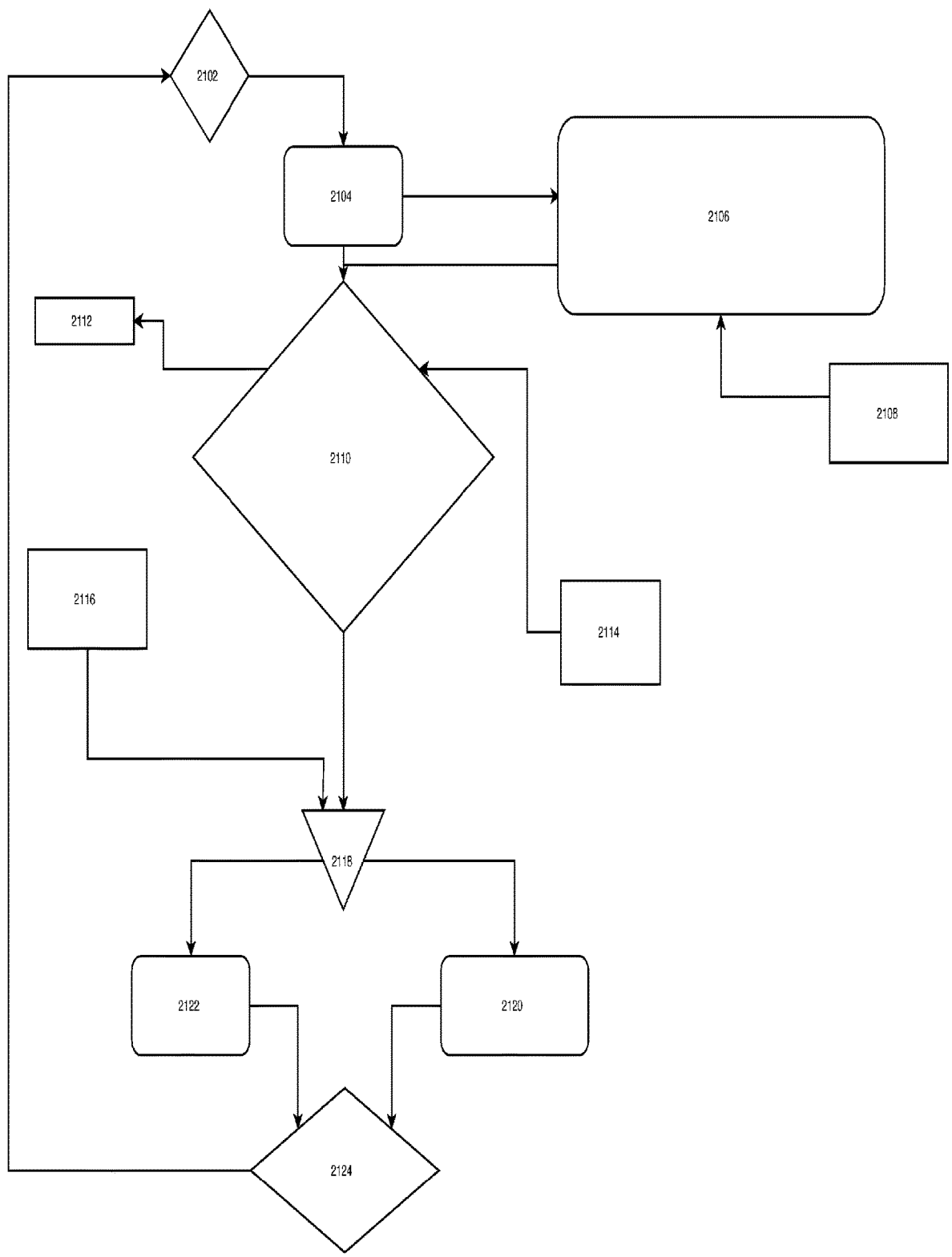
FIG. 21 depicts Flowchart 5.11, a flowchart of a process in algorithmic operations—Recency Weighting Off, consistent with various embodiments.
Figure 22:
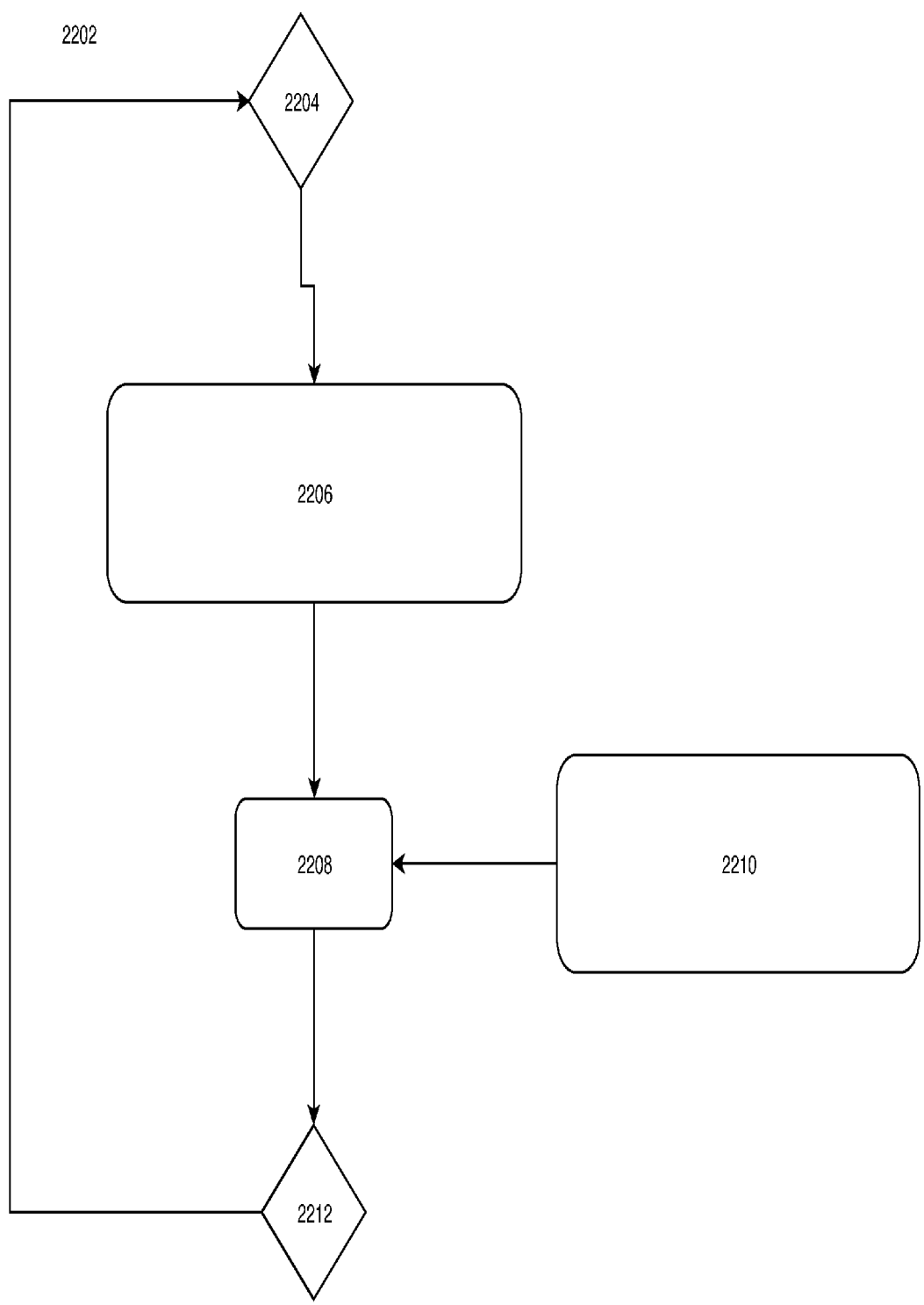
FIG. 22 depicts Flowchart 5.12, a flowchart of a process in algorithmic operations—Loop 8C—"Crossover", consistent with various embodiments.
Figure 23:
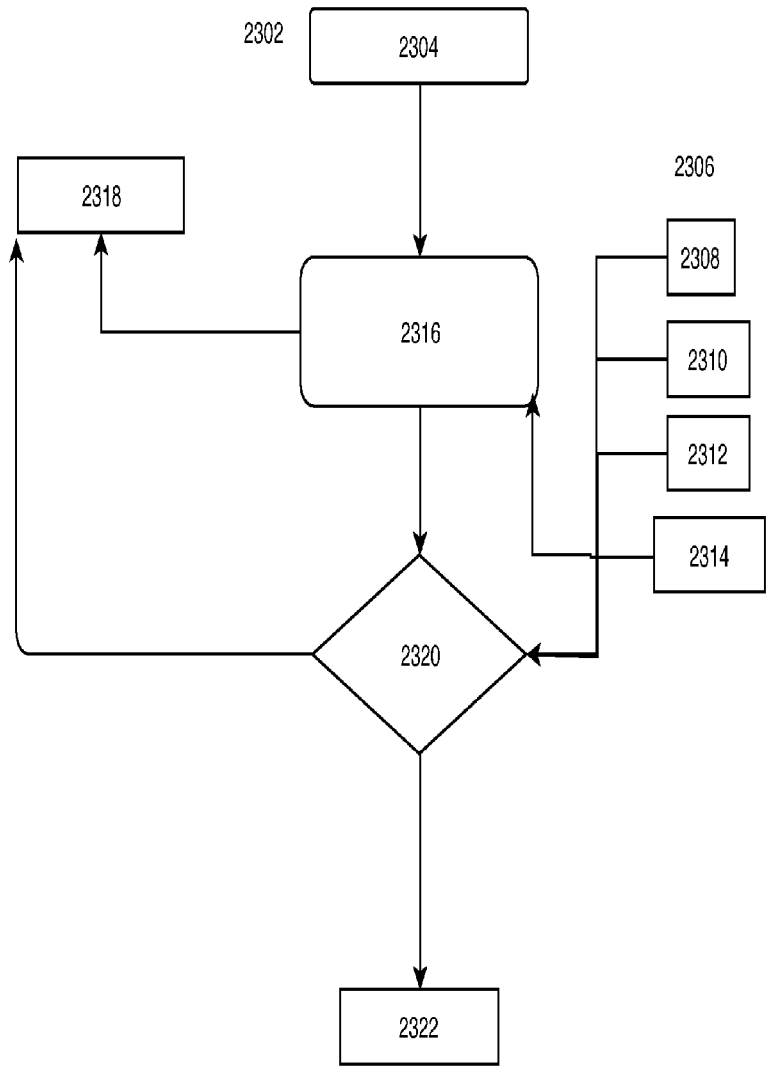
FIG. 23 depicts Flowchart 5.13, a flowchart of a process in algorithmic operations—class Model Method—Mutation occurs here, consistent with various embodiments.
Figure 24:
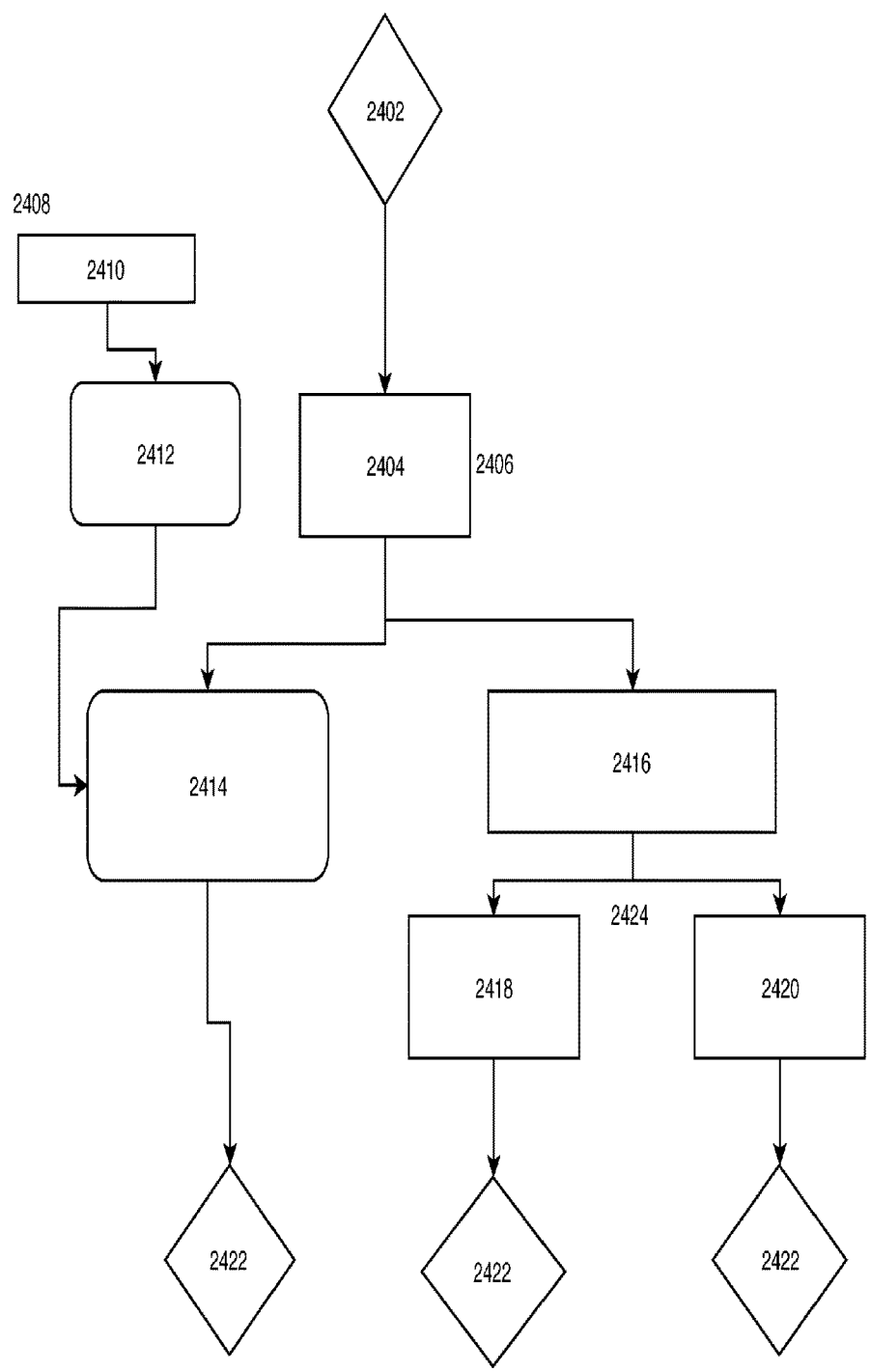
FIG. 24 depicts Flowchart 5.14, a flowchart of a process in algorithmic operations—Loop 13A, consistent with various embodiments.

With regard to Flowchart 5.11 of FIG. 21, the subprocess of weighting games by recency (also called Basic Recency Weighting) may be turned off at any time by the user. It is not needed for the algorithmic system to produce data. However, it may in certain contexts increase the accuracy of the System's results. This subprocess includes the Recency Coefficient, a user defined metric. It can be applied linearly or exponentially, depending on the user's preference. Flowchart 5.11 of FIG. 21 represents the recency weighting being turned off, while in some implementations, the recency weighting may be turned on.

In an illustrative example, an important advantageous technical effect resulting from various ARON embodiments' design and usage is that an evolutionary process that can avoid local maxima could be applied to most any game-like scenario in which the user desires to know whether they should execute a decision represented by a 0, 1 or NULL. Here, it takes the form of betting For, Against, or Neither, but in another context, it might take the form of Buying, Selling, or Holding.

With the algorithmic operations complete, the process moves on to Step 6, Comparison Filter.

Section 6. Comparison Filter

The following specification section refers back to "6" of FIG. 1:

In various embodiments, this process occurs once per model, per game (once per GSR) during the algorithm's runtime. This process is designed to identify when the external experimental variable (in this case, the spread set by the Oddsmaker) deviates significantly from the dynamically generated control (the GSR). Such a process, if implemented correctly, allows for the identification of imperfectly-created, external experimental variables more often than not.

Specific to this process, ModelDeviation is the extent to which the external predictive metric (the Oddsmaker Spread) differs from the prediction generated by the Program (the GameSpreadRatio) and is calculated as follows:

$$ModelDeviation=(ExternalExperimentalVariable-DynamicControlVariable)/DynamicControlVariable$$

Where ExternalExperimentalVariable is the Oddsmaker Spread and is calculated by converting the Spread to a GSR as disclosed herein.

And where DynamicControlVariable is the MedianGSR and is calculated by taking the median of all the GSRs generated during the algorithmic operations of the program, and thereby constitutes the final prediction for a given game.

If ModelDeviation is a prespecified degree greater than that allowed by the Comparison Filter, then that result is kept; otherwise, that result is considered too close to call and is rendered null.

Figure 25:
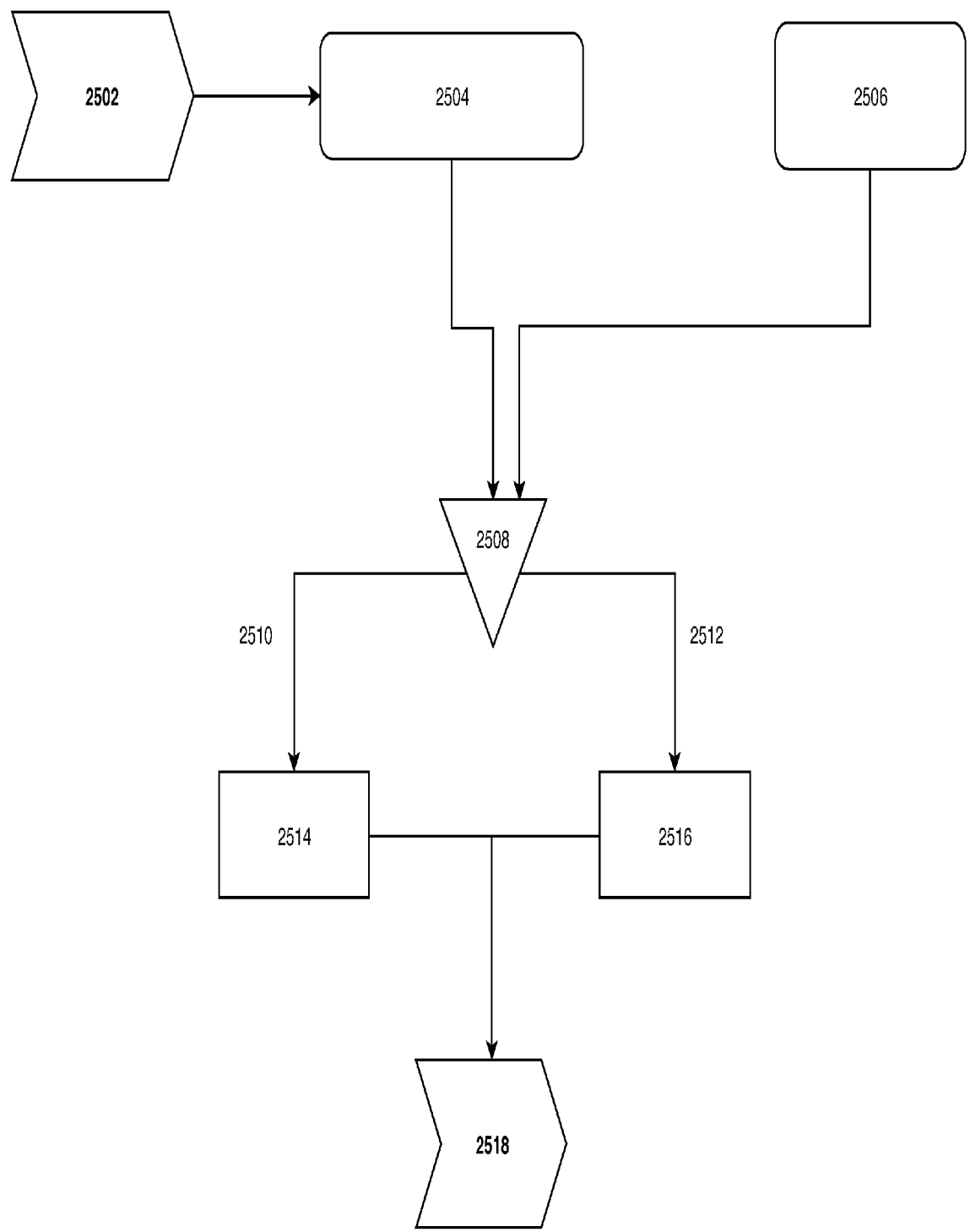
FIG. 25 depicts Flowchart 6, a flowchart for ChoiceCount and SpreadErrorBound Comparison, consistent with various embodiments.

Please turn now to Flowchart 6 of FIG. 25. Flowchart 6 is a flowchart for ChoiceCount and the Comparison Filter, consistent with various embodiments.

The exact logic of this process is specified in full detail in Flowchart 6 of FIG. 25, and consequently does not need to be repeated here. However, as explained in further detail in Analysis and Alternative Embodiments further below, the significance of the Comparison Filter cannot be overstated in that it represents one of the ARON System's most notable technological features—the ability to identify and assess error in game-like scenarios.

The process moves on to Step 7, Storing Interim Results.

Section 7. Storing Interim Results

Please now refer back to "7" of FIG. 1. Following the execution of the above Steps 4 through 6, a significant number of times (likely 1,000+), the following results are stored, consistent with various embodiments:

a) Number of Straight Picks For;
b) Number of Straight Picks Against;
c) Number of ATS Picks For;
d) Number of ATS Picks Against;
e) MedianGSR; and
f) Algorithmic Efficiency Metrics.

Although this step does not merit a flowchart, it presents an opportunity to elaborate on certain metrics which have not yet been covered—for instance, the Median GSR. The Median GSR represents the median of all of the GSRs generated by the algorithm. The number of GSRs generated will be equal to the PredictionSample, the user-defined metric that tells the program how many trials of a prediction it should run.

With the interim results stored, the process moves on to Step 8, Application of Selective Filters.

Section 8. Application of Selective Filters

Referring to '8' of FIG. 1: the process now applies certain selective filters designed to weed out interim results (on a per-game basis) that do not represent an algorithmic process at peak efficiency and/or are deemed too inconclusive to pass through to final comparisons consistent with various embodiments. In various embodiment implementations, these filters are applied as follows:

a) Either of the two Non-Null binary categories (ATS Pick For, ATS Pick Against) must be greater than 0.5 (or the results are inconclusive);
b) As before, the ModelDeviation must be greater than the SpreadErrorBound;
c) The collected algorithmic efficiency metrics must meet or exceed certain predefined standards (for example, in various embodiment implementations, the number of active generations must exceed 42); and FTC must be 0. Please see Section 2 above for more information re FTC.

Failure to meet no less than all three conditions (or all four, if FTC is enabled) will cause the interim result to attain a null value and be disqualified from final consideration.

One further example of an operational efficiency metric would be, for example, when the process must review and decide between keeping or discarding results produced with a trial that failed to operate at peak ability, it might, in one exemplary scenario, determine that the process completed its analysis too quickly and that this means the result will likely be random rather than consequential, so it will discard this result. This, of course, is just one small part of a larger integrated process.

Figure 26:
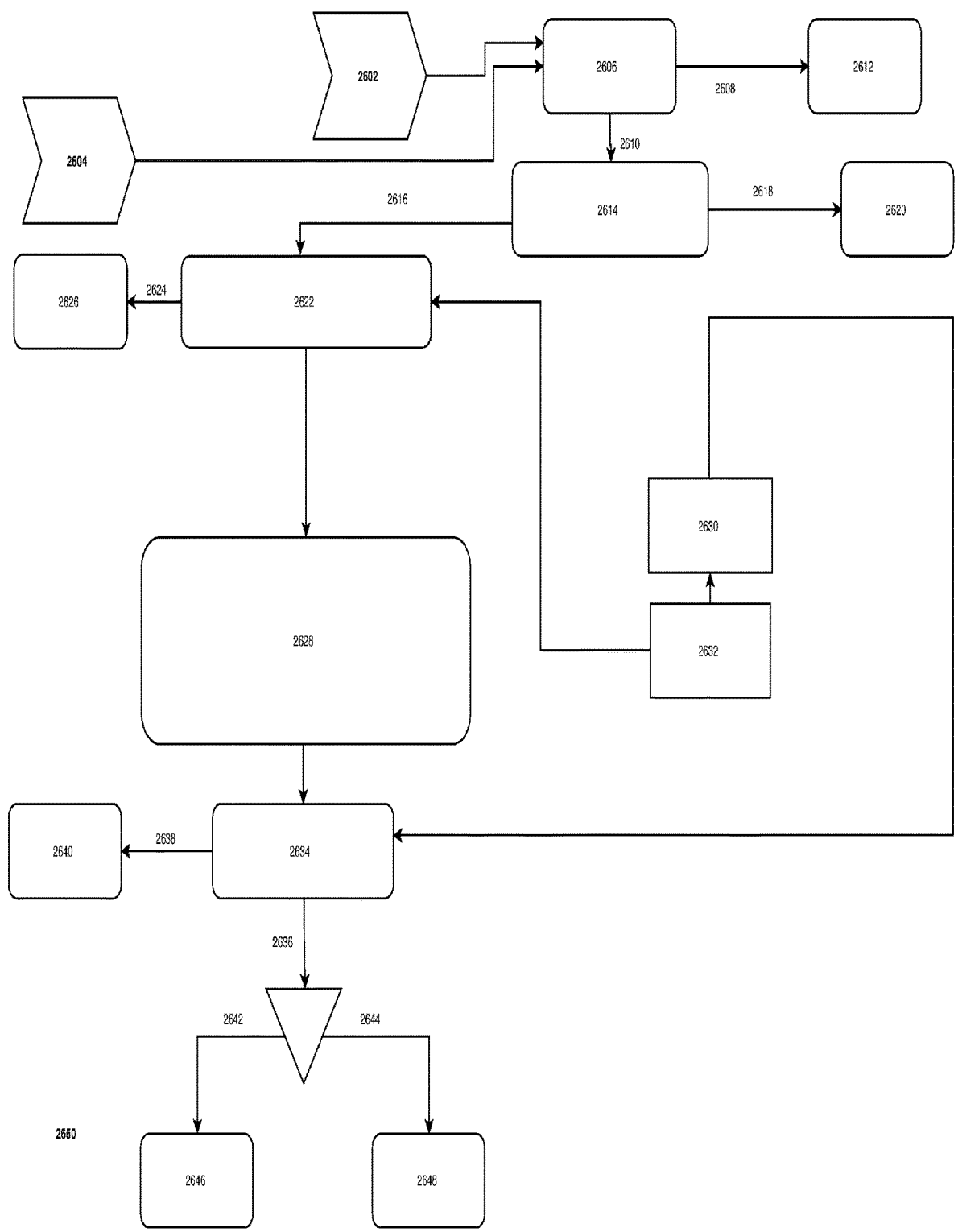
FIG. 26 depicts Flowcharts 8 and 9, a flowchart for applying filters and a flowchart producing a final output, consistent with various embodiments.

Turning now to Flowchart 8 of FIG. 26. Flowchart 8 is a flowchart for applying filters, consistent with various embodiments. As depicted in Flowchart 8, it is at this stage that the program filters out the results and makes the critical distinction of rendering null predictions that it believes to be at least one or more of the following: potentially biased; unfavorable; not representative of efficient algorithmic operations; and not constructed from reliable data. Specific examples of currently implemented filters are given in this section above. Should the filters reach a negative conclusion, the prediction is rendered null. Future embodiments of the program will almost certainly include additional and/or different filters, depending on the context to which the program is being applied.

After the application of filters, the process moves on to Step 9, Final Determination and Output.

Section 9. Final Determination and Output

Referring to '9' of FIG. 1: if the conditions as described in the above Step 8 are met successfully, the final comparison check is executed to determine if the MedianGSR of the distribution of GameSpreadRatios generated for a given game is greater or less than a simple numerical value—in this case, 1. A value greater than one is suitable for one binary output, with a value less than one suitable for its counterpart. It is impossible for the MedianGSR to be equal to 1 per the conditions of the overall program and the algorithmic process in particular.

If the MedianGSR>1, then the resulting output is 0. If the MedianGSR<1, then the resulting output is 1. In the context of the application of the ARON System to sports betting, a 0 identifies the correct betting choice as the Home Team, while a 1 identifies the correct betting choice as the Away Team.

Turning now to Flowchart 9 of FIG. 26. Flowchart 9 is a flowchart for producing a final determination and output, consistent with various embodiments. With the filters applied, the process produces a binary result—either a 0 or a 1—as described in this section above.

ANALYSIS INCLUDING VARIOUS EXEMPLARY EMBODIMENTS

Details of the ARON System and Contemplated ARON Embodiments:

As an initial matter, it should be noted that while this disclosure has thus far referred to an embodiment system as a program or system, it might also be referred to as an engine, in the sense that various ARON embodiment implementations, via database operations and maintenance, may be started and stopped, or left to run idle. This distinction is relevant because the program/system possesses the potential to be expanded while still retaining its present structure in place as the core engine of such an entity.

As herein disclosed, various ARON System embodiments produce technical effects resulting from the various embodiments' ability to successfully determine the outcome of sports games at a profitable percentage, and it will be appreciated by one of ordinary skill in the pertinent art that such a process has applications beyond mere gambling. Also as mentioned previously, these future applications might include predicting elections or various market-related futures. What all of these processes (sports betting, election cycles, and stock fluctuations) have in common is that they are all fundamentally game-like scenarios, with two discrete possible outcomes (success or failure) together with a third default outcome of no action (null).

In such a system, the worst percentage that any one person can expect to achieve predict over a large sample size is 50%—they will get half of their choices right, and half wrong. As the sample size increases, the distribution will become increasingly normalized with a mean and median both trending toward 0.5. This program in both its current and future iterations achieves a percentage significantly higher than 50% when applied to sports betting, but it achieves this not so much by predicting every game correctly as it does by recognizing what games it should not bet on.

This is significant because it demonstrates the most basic function of the program: it identifies a window inside a game-like scenario between the default probability of getting a pre-specified choice incorrect against an external metric and the probability of the external metric having itself been set incorrectly. This window can be represented via the SpreadErrorBound, and might also be characterized as the extent to which the program can yield results different than those forecasted by the odds before the program becomes inaccurate over a large distribution. By identifying this window and then making selections inside it, the System is able to achieve accurate results. However, should the System misestimate the window (or should the window change at a rate faster than the program is able to adjust), it will fail to produce accurate longterm results.

This problem becomes especially pronounced when looking at systems that utilize discrete data adjustments—for example, in sports betting itself, where the data is updated on a per-game basis. Consequently, it is difficult to realize on a discrete level the percentages of accuracy attained by the program until the sample size becomes relatively large, at which point minute differences in accuracy stop making a major impact (the distribution has normalized). It follows, then, that the System's ability to convert accuracy into profit increases as the sample size gets larger, and is far more susceptible to severe fluctuations on a smaller scale.

By this token, it is likely that should the discrete data adjustments begin to occur at such a high frequency that they more closely approximate a constant stream of information, the System would be able to realize financial gains over much smaller sample sizes due to the fact that the distribution would become effectively continuous. This would negate the issue of small fluctuations in accuracy turning into severe fluctuations in profit, as the sample size would be large enough such that ordinarily inconvenient decimal percentages could be realized in practice. This stock market is one example of a system that might better trend toward this extremely favorable continuous distribution.

In addition to presently unknown changes made in an effort to adapt the program to fit the contexts of the other uses as described above, future embodiments would likely center around the System's ability to identify and exploit the hypothetical window of error inherent to a given external institution. This System, in both its present and future iterations, represents the best chance of achieving this result, and furthermore that a System that also made use of a similar computer-implemented method with the express intention of identifying or exploiting said window of error would mimic the herein-disclosed methods and associated technology.

The aforementioned disclosure may also be tailored and modified to further and alternately comprise a wide range of systems designed to forecast game-like scenarios at a rate equal to or higher than an externally derived metric. For example, one possible system could be designed to predict the outcome of political elections against the results as forecasted by the polls. Such a system would operate in an analogous fashion to the extant system for predicting the results of games against the spread. Here, the game-like scenario at hand might be between two candidates or political parties. An analog to a game would be a given instance of an election taking place within a specified county, state or country (or some other demographic subdivision). The external metric to which the program would make a comparison to assess significant difference would be the results and expected outcome as forecasted by the political polls of various organizations and news outlets, which may be seen in these and similar instances as functioning as a spread— both indicate the favored and outcome together with an expected margin of victory. Such as program would likely include an autonomous method of deriving political issues, or topics of interest to voters, from statistics related to campaign finance and/or historical voting trends and demographic data. The metrics associated with these issues (voting numbers, financial data, etc.) would then become analogous to the statistics used when predicting sports games. The System would then be able to conduct predictive algorithmic operations in much the same way as it would for sporting events, making forecasts as or more accurate than those conducted via the polls between two given contenders for a political position, and by doing so "fact-checking" the polls themselves. Another alternate embodiment of the System might be one in which the program predicted the long or short-term change in the price of a given stock or financial asset. In this case, the game-like scenario is whether to buy, sell, or hold, with holding corresponding to an instance of the System outputting a null decision. The analog to a game would be the stock itself, with the game being "won" if the stock increases, and the game being "lost" if the stock decreases. An external predictive metric (the spread) against which the System could make comparisons might be the forecast made by an economist or agglomerate of economists (such as a financial firm), allowing the system to make a prediction with an equal or better chance of coming to fruition than the forecast made via the external metric. Here, the statistics could be data concerning stock price history, price/earnings ratio, or data that is far more "alternative" in nature—history of corporate bonuses, statistics on company demographics, etc. Another possible embodiment might be predicting the weather forecast between sets of variables in game-like scenarios; for instance, will it rain or not, will it be sunny or not. Here, the game is a given timespan (like a day, for instance) and the two teams are rain or not rain. The spread is the probability of rain as set by a weather forecaster or agglomerate of weather forecasters. In all of the above cases, the raw data would have to be massaged and modified in a similar fashion to the process used by the extant program to account for differences in data values originating from prior bulk information and data values originating from more current information. In all of the above cases, while an external predictive metric is used, the System is also capable of generating a prediction "straight-out"—that is to say, without comparing its own prediction to the external metric. In all of the above cases, the decision to be made is set in the context of a game-like scenario that does not preclude the tertiary possibility of taking no action—holding instead of buying or selling, abstaining instead of voting, etc. In all of the above cases, the program acts as a means of both generating a unique prediction while simultaneously "fact-checking" the external metric in that it is able to identify and exploit a window of error in the process used by the purveyors of the original external metric (as disclosed herein). In sum, future embodiments of the program (though not limited to those discussed above) would constitute a system that was able to assess and predict future outcomes of game-like scenarios and consequently identify and exploit a hypothetical margin of error present in extant external methodologies used to predict those same future outcomes.

Algorithmic Operations Interface and Explanations and Definitions Thereof:
Exemplary classes and methods used during algorithmic operations examples as referenced in Flowcharts 5.1 through 5.14 as represented in FIGS. 8 through 24:
class Sim(ParentClass=Object):
def init (self, mutationChance, popSize, generations):
   Creates an instance of the Sim—Does not return a value
def createGame (self, team1pts, team2pts):
   Creates instance of subclass Game (see Game→init)—
      Returns newly created Game Instance
def simGen (self, parentGen):
   Simulates 1 generation of selection, crossover, mutation
      (see prior definition of these terms under Section II,
      Item 5.3)
def makeStartGen (self):
   Creates and returns a randomized starting population
class Game (ParentClass=Sim):
def init (self, team1pts, team2pts, Stats, teamStats, Sim, mainGame=False):
   Creates a representation of a "game". This is an instance
      of a subclass of the particular Sim Object from which
      it was called—Stats are organized and returned
class Game (ParentClass=Sim):
   This is a class which represents a statistical model (a
      unique set of coefficients) acting as a single member in
      the evolutionary algorithmic proc
def_init_(self, Sim, parent1, parent2):
   Sim is an instance of the Sim Object, while parent1 and
      parent2 are model instances. The parameters for parent1 and parent2 are set to None by default, as this
      allows the model to be created randomly or as the result
      of crossover between two parental models. This crossover occurs when the parents' parameters are overridden with Model instances instead of None.
   Creates either a random model or a model created through
      crossover between the two model classes Mutation also
      occurs during this process
   Returns itself

DETAILED DESCRIPTION OF FIGS. 1-26

(Drawing Element Identification According to Reference Numbers): Infra, "Figure" refers to the Figure Number at the head of each Figure. The number in parentheses, to wit "(_)," refers to the Flowchart Number as referenced in the Specification. The Heading following the parentheses refers to the title of the broader section as referenced in FIG. 1.
FIG. 1: (0) General Structure
102 Raw data downloaded (or inputted via API)
104 Import data into database, sort into structures
106 PER Calcs used to determine Weight Factors
108 Execute Series of Procedures to Transform/Adjust Data
110 Input
112 Convert Spread To GSR
114 Retrieve pertinent games
116 GSR Upper
118 GSR Lower
120 Stats
122 Algorithmic Operations
124 Weight Params, Settings
126 Operational efficiency metrics
128 Comparison Filter (SpreadErrorBound)
130 Per game per model (per GSR)
132 Dynamic fitness adjustment, running for gens per model per game
134 For straight
136 Against straight
138 For Spread
140 Against Spread
142 Toss
144 MedianGSR of the generated distribution of all-GameSpreadRatios
146 Main Database 148 Selective Filters: For, Against >0.5; SpreadErrorBound <ModelDeviation; ActiveGens >OptimumActiveGens
150 If conditions met
152 Else
154 NULL
156 Outputs distribution of predictions
FIG. 2: (1) Raw Data Import
202 Entry Point: Players Per-Game Stats
204 Teams Per-Game Stats
206 Loop A
208 Reset Staging Tables
210 Import data files into Staging Tables
212 Stored procedure retrieves data from files
214 Isolate Common Data Errors (Formatting, Spelling) to be Corrected if needed
216 Validate Teams
218 Else If Teams are Invalid
220 If Teams are Valid, End Loop A
222 Validate Players
224 New Players?
226 Yes
228 No
230 Add New Players
232 Validate Games Against Schedule Data
234 No
236 Isolate Needed Corrections
238 For each new game
240 Loop B
242 Insert Players By Team By Season Data
244 Insert Player Stats By Game
246 Update Auxiliary Game Data
248 Update Points
250 Update Oddsmaker Data
252 Update PER, uPER, APER Table Calculations
254 If No More Games, End Loop B
256 Else Repeat
258 Exit Point: Flowchart 2A
FIG. 3 (2A) Initial Normalization of Raw Data
302 Entry Point: Flowchart 1
304 Imported Data
306 Loop A
308 Steps during this loop are calculated on a per-game basis (ends during 2B Flowchart)
310 PER is calculated for each player who played more than the required minutes minimum (for each complete season)
312 Current Season PER is summed on a by-team basis
314 Previous Season PER is summed on a by-team basis
316 Relative Current Season Weight Factor
318 User-tailorable settings that affect the operation of the process at this stage include:
320 PER Minimum Required Total Minutes Value
322 Playoffs
324 Regular
326 Default Weight Factor
328 Regular Season Game Value
330 Playoff Game Value
332 Determines appropriate game type
334 Appropriate value for that game type is incorporated into RCSWF
336 Exit Point: Flowchart 2B
FIG. 4 (2B) Calculation of Modified Averages
402 Entry Point (1): Flowchart 1
404 Simple Player and Team Statistics
406 Advanced Stat Calculations
408 Identify Season Type
410 If Playoffs
412 Identify Players on Team who were in involved in Playoffs last year
414 Create virtual team of those players
416 If Regular Season
418 Complete Team Statistics are created by consolidating Player Stats
420 Simple Average of Current Season Statistics is taken
422 Simple Average of Previous Season Statistics taken
424 Modified Statistical Averages
426 Entry Point (2): Flowchart 2A
428 Loop A (continued)
430 Relative Current Season Weight Factor
432 Exit Point (1): Flowchart 2C
434 End Loop A
436 Modified Averages are Normalized (to a similar scale)
438 Nonlinearize
440 Yes
442 No
444 Final Statistical Team Averages
446 Exit Point (2): Flowchart 3
FIG. 5 (2C) FTCLimit
502 Entry Point: Flowchart 2B
504 Identify previous set of games (Previous)
506 Sum PER of Starters from those game
508 Identify set of games before that (Last)
510 Sum PER of Starters from those games
512 Compare the two sums: (Previous-Last)/Previous
514 If Comparison >FTCLimit, designate FTCPositive=1
516 User-Defined Metric: FTCLimit
518 Exit Point: Flowchart 8, 9
FIG. 6 (3) User Input and Game Initialization
602 Entry Point: Flowchart 2B
604 Parameters are entered (see Section II, Item 3)
606 Prediction Sample Size
608 What stats to value
610 Pull all stat types from the database
612 Is the stat valued?
614 If Valued=True
616 Else do nothing
618 Valued Stat Types
620 Game Prediction is Initialized
622 Is Spread <0?
624 Yes (Home Team is favored)
626 No (Away Team is favored)
628 Exit Point (3) Flowchart 4
630 Prediction Sample, Valued Stat Types
632 Exit Point (1): Flowchart 5
634 Metadata parameters are sent to be stored in Database
636 Exit Point: (2) Flowchart 7
FIG. 7 (4) Transformation of the Spread into the GSR
702 Entry Point: User input received (See Flowchart 3)
704 Determine Favored Team
706 Spread <0: Home Favored
708 Spread >0: Away Favored
710 Database connected via OdatabaseC Driver
712 Main Database
714 Retrieve Average Points Per Game for Favored Team (PPGFavored)
716 Create GameSpreadRatio:
718 If Home is favored:
720 GSR Upper: (PPGFavored+Spread)
722 GSR Lower: PPGFavored
724 GameSpreadRatio (PPGFavored+Spread)/PPGFavored
726 If Away is favored:
728 GSR Upper: PPGFavored
730 GSR Lower: (PPGFavored+Spread)
732 GameSpreadRatioP PGFavored/(PPGFavored+Spread)

734 Appropriate GSR is fed into Algorithm
736 Exit Point: Flowchart 5
FIG. 8 (5.1) Algorthmic Operations—Initialization
802 Entry Point: Flowcharts 3, 4
804 Retrieve All Final Game Scores From Database
806 Main Database
808 RetrieveValued Statistics for past games that involved either or both of the Teams involved in current Game as far back as SeasonsIncluded
810 Valued Stat Types
812 SeasonsIncluded
814 MultipleGames=0:
816 PredictionSample
818 Create Container for GameSpreadRatios
820 Begin Counting Active Generations; Total Generations from all predictions
822 While MultipleGames<PredictionSample:
824 Instantiate the Simulation Object
826 MutationChance
828 Population
830 Generations
832 Elitism
834 SpreadErrorBound
836 Threshold
838 Exit Point: Flowchart 5 Continued
FIG. 9 (5.2A) Prediction Driver
902 Entry Point: Flowchart 5
904 MoneylineFinalPredictions Counter (This will be used in 5.2C)
906 While MultipleGames<PredictionSample
908 Loop A
910 Creates a Sim Instance (named SIm) with settings as parameters
912 Algorithm Settings (See 5.4)
914 Sets genNumber=1
916 Creates training games one at a time. There are instances of Sim.
918<sim.CreateGame (GameResults[ID][0], GameResults[ID][1]. teamStats>(See 5.5)
920 Creates currGen pointer variable
922 Creates a set of randomized Model Instances. This set represents the instance data of the Sim Object assigned to currGen variable
924<Sim.makeStartGen>(See 5.3)
926 currGen (Dynamic Variable that points to Current Generation list)
928 Loop B (5.7)
930 genNumberUpperBound (user-adjustable)
932<While sim.Caught=False and Sim.genNumber<(genNumberUpperBound)>
934 Loop C (5.9)
936 <for i in range (sim.gens)> (5.4)
938 Exit Point: Flowchart 5.2B
FIG. 10 (5.2B) Prediction Driver
1002 Entry Point: Flowchart 5.2B
1004 Creates and sets finalGen to currGen
1006 finalGen: finalGen is the list of final models, which represent the culmination of the evolutionary process. These will be used to predict the game result.
1008 Creates GameToBePrediced by instantiating an instance of the game class
1010<sim.createGame (teamStats, finalGame=True)
1012 Main Database
1014 Pulls from the Database the current team stats up to but not including the GameToBePredicted
1016 GameToBePredicted
1018 Loop D: <for i in finalgen>,Predict (GameToBePredicted) using each model in the finalGen. Then, append the result to FinalGameSpreadRatios
1020 Creates list: FinalGameSpreadRatios
1022 FinalGameSpreadRatios
1024<i.predict (GameToBePredicted) For Predict, See 5.10
1026 Exit Point: Flowchart 5.2C
FIG. 11 (5.2C) Prediction Driver
1102 Entry Point (1): Flowchart 5.2B
1104 Exit Point (1): Flowchart 6
1106 Appends FinalGameSpreadRatio to all GameSpreadRatios (before Loop A in 5.2A)
1108 Creates the Variables: MoneylinePicksHomeMoneylinePicksAway
1110 MoneylinePicksHome
1112 MoneylinePicksAway
1114 FinalGameSpreadRatios (created in 5.2B)
1116 Loop E: Read all values in FinalGameSpreadRatios
1118 For each value:
1120 If Value >1 Increment MoneylinePicksAway
1122 Else Value <1 Increment MoneylinePicksHome
1124 Count MoneylinePicksHome, Away
1126 If HomePicks >AwayPicks
1128 Else HomePicks <AwayPicks
1130 Increment Home
1132 Increment Away
1134 Entry Point (2): Flowchart 5.2A
1136 MoneylineFinalPredictions Counter
1138 Increment MultipleGames (iterate Loop A)
1140 Loop A repeats until PredictionSample=MultipleGames
1142 Loop A Ends (Began in 5.2A)
1144 Exit Point (2): Flowchart 5.2D
FIG. 12 (5.2D) Prediction Driver
1202 Entry Point (1) Flowchart 5.2C
1204 Creates and sets FinalFavored to the median value of allGameSpreadRatios (called MedianGSR)
1206 Creates and fills FinalFavored
1208 Creates and sets additional Metadata variables AverageTotalGens, AverageActiveGens
1210 AverageTotalGens (creates and fills)
1212 AverageActiveGens (creates and fills)
1214 AverageTotalGens=TotalGens/PredictionSample
1216 FinalFavored, ChoiceCount, MoneylinePicks, and Metadata are stored in Database (This is step 7 in the General Flowchart (0))
1218 Entry Point (2): Flowchart 3
1220 Metadata parameters (AssociatedModelID, OddsmakerID, and related parameters)
1222 Entry Point (3): Flowchart 6
1224 Count All HomePicks
1226 ChoiceCountHome
1228 Count All AwayPicks
1230 ChoiceCountAway
1232 OdatabaseC Driver
1234 Main Database
1236 Exit Point: Flowchart 8, 9
FIG. 13 (5.3) Make Start Gen—This process takes place within the Sim class.
1302 Create empty container called startGen
1304 Creates startGen
1306 Appends value to startGen container
1308 Return value is a randomized Model instance, this is saved in startGen container
1310 Loop A
1312 Converts statsBigList (5.4) into a GPU-optimized structure 1314 Parameters: Stats, Self (as indicated in 5.4)
1316 Calls init ( )method of Model Class
FIG. 14 (5.4) class Sim init:
1402 Stores all Parameters
1404 Stats
1406 MutationChance
1408 popSize
1410 Generations
1412 Parameter Shapes, this is the universal structure of the neural networks, this is a list of (matrix, vector) pairs, where each pair specifies the behavior of the layer of the neural network at that index
1414 Loss Function, this is a function reference that specifies how the performance of the neural network is evaluated, for example squared loss would calculate the square of prediction minus the target data, scaled by a list of weighting coefficients for a given list of predictions, weighting coefficients, and target data (see 5.5 for definition of target data)
1416 Method Parameters
1418 Creates empty list: "Games"—this will later store training games
1420 Creates Games
1422 creates elementBounds, (user specified)
1424 This is a two item list specifying the upper and lower bound of the real range of possible element weights. This partially defines the search space for the neural networks
1426 Counts # of Stats in Use
1428 Creates NumStats
1430 Creates Two Containers: StatsBigList, GameScoreRatioBigList
1432 StatsBigList
1434 GameScoreRatioBigList
1436 Creates and Sets Caught=False (Caught is Meta Data as well as the stopping criteria for the genetic algorithm)
1438 Caught
1440 Creates GenNumber
1442 GenNumber (Meta Data)
1444 Updated each generation to reflect # of models that fail to meet the success threshold—See SimGen (5.8)
1446 Creates MetaData Container "Kills", "Kills" is used to determine when the success threshold should become less stringent, and how much so. See FIG. 17
1448 Creates and sets Dynamic Threshold to initial Value (as configured in settings)
1450 Dynamic Threshold
1452 Kills
FIG. 15 (5.5) class Game init
1502 Stores Parameters as instance Data
1504 Team1Pts
1506 Team2Pts
1508 Stats
1510 teamStats
1512 Sim
1514 MainGame (boolean)
1516 Target Data
1518 Separates Stats into Team1Stats and Team2Stats
1520 Team1Stats
1522 Team2Stats
1524 Converts Team1Stats, Team2Stats into a GPU-optimized structure
1526 Checks and removes corrupt data
1528 Stores Team1Stats+Team2Stats, Ratio in SimStatsBigList (see 5.4)
FIG. 16 (5.6) Creation Method—Randomized Version (without Crossover), creates a random neural network for a specified architecture
1602 Stores Parameters
1604 Parameters:
1606 Sim
1608 Stats
1610 Parameter Shapes
1612 Creates instance variables WeightMatrices, by randomly instantiating each element to a value in the real range specified by sim.elementBounds, these are matrices and vectors all stored as a list, these, along with the activation function, fully specify the behavior of the neural network
1614 WeightMatrices, a 3D list with shape (Weight Matrices)=Parameter Shapes
1616 Converts Parameters to GPU Compatible Data
FIG. 17 (5.7) Loop B
1702 Entry Point: Loop B
1704 SimGen method defined on 5.8
1706 <sim.simGen (currGen)>Parameter: currGen (see 5.2)
1708 Creates and sets NextGen to the returned list of Models from method call
1710 Dynamic NextGen
1712 currGen=NextGen
1714 currGen is defined outside Loop B
1716 Increments Gen Number (from 5.4)
1718 If SimKills <Sim.PopSize-1 (both are from 5.4)
1720 Increments TotalGens (defined before Loop A)
1722 If True
1724 If False
1726 Increment totalActiveGens+=1
1728 Does sim.genNumber % 5=0?
1730 If True
1732 If False
1734 Does sim.Kills=sim.popSize ?
1736 If True
1738 If False
1740 Sim.Threshold+=0.001
1742 sim.Kills >MediumCatchNum
1744 If True
1746 If False
1748 Sim.Threshold+=0.001
1750 Exit Point: Loop B Repeats
FIG. 18 (5.8) class Sim Method: SimGen
1802 This method simulates one generation. For more details, see the interface in the documentation
1804 Overview:
1806 ParentGen
1808 Selection
1810 Crossover
1812 Mutation
1814 NextGen
1816 Parameters:
1818 ParentGen: Variable that stores a list of model objects
1820 Creates an empty list called genSurvivors
1822 genSurvivors
1824 Loop 8A (5.11)
1826 Kills
1828 If Kills=0
1830 TRUE
1832 FALSE
1834 self. Caught=True (see 5.4)
1836 Loop 8B (While genSurvivors has less models than popSize, create new random models via Model (stats)—see 5.6)
1838 Create nextGen list
1840 nextGen
1842 Loop 8C (see 5.12)
1844 Returns nextGen FIG. 19 (5.9) Loop C—(Very similar to Loop B)
1902 Loop C
1904 SimGen—see 5.8
1906 Creates and sets NextGen to the returned list of Models from method call (see 5.2)
1908 Dynamic NextGen
1910 CurrentGen=NextGen
1912 Increments Gen Number
1914 Increments totalGens
1916 Loop iterates
FIG. 20 (5.10) Class Model Method: Predict
2002 Parameters
2004 Game, this is the game to be predicted
2006 Sim.activationFunction
2008 Weights
2010 <For i in length (Model.weightMatrices)>
2012 Applies Sim.activationFunction to the output of layer (i−1) multiplied by weightMatrices[i, 0] and summed with weightMatrices[i, 1], in other words it applies the activation function to the result of a linear transformation (matrix multiplication) with an added bias (vector addition) the input to the first layer is game.stats and the output of the final layer is a single scalar value of the prediction
2014 Outputs Game prediction
FIG. 21 (5.11) Loop 8A, assessing the weighted prediction error of the neural network models
2102 Loop 8A
2104 Create and set Predicted to 0
2106 Creates list of Recency Multipliers: length of list=# training games Element xi=i^ Recency Coefficients, Recency Multipliers allow the program to favor training instances which it believes to have less noise, and penalizes error on those examples more heavily
2108 Recency Coefficients (A user defined method)
2110 For Game in self.games: Increment Predicted by the Sim.lossFunction (Predictions, Game.TargetData, RecencyCoefficients) (See 15) Also see Predict (FIG. 20), Predictions is generated by calling Predict (FIG. 20) for each training game
2112 Updates Predicted
2114 self.Games (see 5.4, 5.5)
2116 Threshold (external setting)—See 5.1
2118 If Predicted/(Number of Games)<Threshold
2120 Append a member to genSurvivors (See 5.10)
2122 Increment kills
2124 Loop 8A repeats (for next member)
FIG. 22 (5.12) Loop 8C—Crossover driver
2202 <for i in range (popSize) >
2204 Loop 8C
2206 Creates new model instances through crossover with random pairs of models in genSurvivors. It uses the created models to populate nextGen
2208 Method Call: Model (init method)—see 5.13
2210 Parameters: Stats Parent1=Random (from genSurvivors) Parent2=Random (from genSurvivors)
2212 Loop 8C repeats
FIG. 23 (5.13) class Model (Mutation occurs here), this is an instance of a neural network
2302 Method init (with crossover)
2304 Store Parameters
2306 Parameters
2308 Sim
2310 Parent1 (an instance of the Model class)
2312 Parent2 (an instance of the Model class)
2314 Sim.params (this is the structure of the neural network architecture, universal across models)
2316 Creates WeightMatrices List (this is the container for the neural network weights and biases)
2318 WeightMatrices
2320 Loop 13A (See FIG. 24), this fills WeightMatrices
2322 Returns itself
FIG. 24 (5.14) Loop 13A, Mutation and Crossover—Handles the creation of the evolved generation of neural network models:
2402 Loop 13A
2404 Iterates over each element in WeightMatrices (See Model class, FIG. 23)
2406 <For weight element indices (i, j, k) in WeightMatrices>, this is looping over the indices of each weight element, aka every component of the matrix, vector pairs that constitute the neural network, the indices are pairs (i, j, 0) for vectors, triplets (i, j, k) for matrices
2408 External Setting (See 5.4)
2410 MutationChance
2412 Occurs with probability=MutationChance
2414 Weight element (i, j, k) is set to a random number in sample space. This is a mutation
2416 Occurs with P=1—mutationChance
2418 Weight element (i, j, k) set to Parent1's Value
2420 Weight element (i, j, k) set to Parent2's Value
2422 Loop iterates
2424 Each occurs with probability p=0.5, this is Crossover
FIG. 25 (6) ChoiceCount/SpreadErrorBound Comparison
2502 Entry point: Flowchart 5.2C
2504 Take in current FinalGameSpreadRatio (see 5.2C)
2506 SpreadErrorBound—External User-Controlled Setting (See Documenation)
2508 Compare FinalGameSpreadRatio to SpreadErrorBound
2510 If FinalGameSpreadRatio<1 AND FinalGameSpreadRatio<SpreadErrorBound
2512 If FinalGameSpreadRatio>1 AND FinalGameSpreadRatio<SpreadErrorBound
2514 Increment HomeTally+=1
2516 Increment AwayTally+=1
2518 Exit point: Flowchart 5.2D
FIGS. 26 (8 and 9) Application of Filters, Final Output
2602 Entry point (1): Flowchart 2C
2604 Entry point (2): Flowchart 5.2D
2606 Is FTCPositive?
2608 TRUE
2610 FALSE
2612 Pick is Disqualified
2614 Check to See if HomePicks OR AwayPicks>0.5
2616 TRUE
2618 FALSE
2620 Pick is NULL
2622 ActiveGens >OptimumActiveGens
2624 FALSE
2626 Pick is NULL
2628 Create ModelSpreadDeviation: ABS((OddsmakerGSRFromSpread−MedianGSR)/OddsmakerGSRFromSpread)
2630 Comparison Filters
2632 Algorithmic Efficiency Filters
2634 Is ModelSpreadDeviation >SpreadErrorBound?
2636 TRUE
2638 FALSE
2640 Pick is NULL
2642 If MedianGSR >1
2644 If MedianGSR<1
2646 FinalChoice=0 (Home)
2648 FinalChoice=1 (Away)
2650 Final Result (propagated via API)

Specifications Generally

In the Summary above and in this Detailed Description, and the Claims below, and in the accompanying drawings, reference is made to particular features of various embodiments of the invention. It is to be understood that the disclosure of embodiments of the invention in this specification includes all possible combinations of such particular features. For example, where a particular feature is disclosed in the context of a particular aspect or embodiment of the invention, or a particular claim, that feature can also be used—to the extent possible—in combination with and/or in the context of other particular aspects and embodiments of the invention, and in the invention generally.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

In the present disclosure, various features may be described as being optional, for example, through the use of the verb "may;", or, through the use of any of the phrases: "in some embodiments," "in some implementations," "in some designs," "in various embodiments," "in various implementations,", "in various designs," "in an illustrative example," or "for example;" or, through the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

In various embodiments, elements described herein as coupled or connected may have an effectual relationship realizable by a direct connection or indirectly with one or more other intervening elements.

In the present disclosure, the term "any" may be understood as designating any number of the respective elements, i.e. as designating one, at least one, at least two, each or all of the respective elements. Similarly, the term "any" may be understood as designating any collection(s) of the respective elements, i.e. as designating one or more collections of the respective elements, a collection comprising one, at least one, at least two, each or all of the respective elements. The respective collections need not comprise the same number of elements.

While various embodiments of the present invention have been disclosed and described in detail herein, it will be apparent to those skilled in the art that various changes may be made to the configuration, operation and form of the invention without departing from the spirit and scope thereof. In particular, it is noted that the respective features of embodiments of the invention, even those disclosed solely in combination with other features of embodiments of the invention, may be combined in any configuration excepting those readily apparent to the person skilled in the art as nonsensical. Likewise, use of the singular and plural is solely for the sake of illustration and is not to be interpreted as limiting.

In the present disclosure, all embodiments where "comprising" is used may have as alternatives "consisting essentially of," or "consisting of." In the present disclosure, any method or apparatus embodiment may be devoid of one or more process steps or components. In the present disclosure, embodiments employing negative limitations are expressly disclosed and considered a part of this disclosure.

Certain terminology and derivations thereof may be used in the present disclosure for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "comprises" and grammatical equivalents thereof are used herein to mean that other components, ingredients, steps, among others, are optionally present. For example, an embodiment "comprising" (or "which comprises") components A, B and C can consist of (i.e., contain only) components A, B and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)—(a second number)," this means a range whose limit is the second number. For example, 25 to 100 mm means a range whose lower limit is 25 mm and upper limit is 100 mm.

Many suitable methods and corresponding materials to make each of the individual parts of embodiment apparatus are known in the art. According to an embodiment of the present invention, one or more of the parts may be formed by machining, 3D printing (also known as "additive" manufacturing), CNC machined parts (also known as "subtractive" manufacturing), and injection molding, as will be apparent to a person of ordinary skill in the art. Metals, wood, thermoplastic and thermosetting polymers, resins and elastomers as may be described herein-above may be used. Many suitable materials are known and available and can be selected and mixed depending on desired strength and flexibility, preferred manufacturing method and particular use, as will be apparent to a person of ordinary skill in the art.

Any element in a claim herein that does not explicitly state "means for" performing a specified function, or "step for" performing a specific function, is not to be interpreted as a "means" or "step" clause as specified in 35 U.S.C. § 112 (f). Specifically, any use of "step of" in the claims herein is not intended to invoke the provisions of 35 U.S.C. § 112 (f). Elements recited in means-plus-function format are intended to be construed in accordance with 35 U.S.C. § 112 (f).

Recitation in a claim of the term "first" with respect to a feature or element does not necessarily imply the existence of a second or additional such feature or element.

The phrases "connected to," "coupled to" and "in communication with" refer to any form of interaction between two or more entities, including mechanical, electrical, magnetic, electromagnetic, fluid, and thermal interaction. Two components may be functionally coupled to each other even though they are not in direct contact with each other. The term "abutting" refers to items that are in direct physical contact with each other, although the items may not necessarily be attached together.

The word "exemplary" is used herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, Figure, or description thereof for the purpose of streamlining the disclosure. This method of disclosure, however, is not to be interpreted as reflecting an intention that any claim in this or any application claiming priority to this application require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

According to an embodiment of the present invention, the system and method may be accomplished through the use of one or more computing devices. One of ordinary skill in the art would appreciate that an exemplary system appropriate for use with embodiments in accordance with the present application may generally include one or more of a Central processing Unit (CPU), Random Access Memory (RAM), a storage medium (e.g., hard disk drive, solid state drive, flash memory, cloud storage), an operating system (OS), one or more application software, a display element, one or more communications means, or one or more input/output devices/means. Examples of computing devices usable with embodiments of the present invention include, but are not limited to, proprietary computing devices, personal computers, mobile computing devices, tablet PCs, mini-PCs, servers or any combination thereof. The term computing device may also describe two or more computing devices communicatively linked in a manner as to distribute and share one or more resources, such as clustered computing devices and server banks/farms. One of ordinary skill in the art would understand that any number of computing devices could be used, and embodiments of the present invention are contemplated for use with any computing device.

In various embodiments, communications means, data store(s), processor(s), or memory may interact with other components on the computing device, in order to effect the provisioning and display of various functionalities associated with the system and method detailed herein. One of ordinary skill in the art would appreciate that there are numerous configurations that could be utilized with embodiments of the present invention, and embodiments of the present invention are contemplated for use with any appropriate configuration.

According to an embodiment of the present invention, the communications means of the system may be, for instance, any means for communicating data over one or more networks or to one or more peripheral devices attached to the system. Appropriate communications means may include, but are not limited to, circuitry and control systems for providing wireless connections, wired connections, cellular connections, data port connections, Bluetooth connections, or any combination thereof. One of ordinary skill in the art would appreciate that there are numerous communications means that may be utilized with embodiments of the present invention, and embodiments of the present invention are contemplated for use with any communications means.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description may set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

Traditionally, a computer program consists of a sequence of computational instructions or program instructions. It will be appreciated that a programmable apparatus (i.e., computing device) can receive such a computer program and, by processing the computational instructions thereof, produce a further technical effect.

A programmable apparatus may include one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. An apparatus comprising:
   a memory storage component;
   a network interface;

a display device;

at least one processor to process at least one sports game's predictive model, and to receive and process a selection of elements for oddsmaking to predict a game's outcome, wherein the elements include one or more past game events and game-related data and historical data about a game and its historical data about its separate opposing participants;

said process being:

to model a game-like scenario and predict a game-like scenario outcome, the model's process comprising:

a. constructing a predictive model population comprising a plurality of neural network models each configured to predict a game-like scenario outcome, wherein the game-like scenario comprises a sporting event, b. wherein each of the plurality of neural network models is configured to predict the game-like scenario outcome determined as a function of a weight value governing the influence of a neural network input on a neural network output, and c. wherein each weight value is initialized to a value determined as a function of a category of statistical data associated with the game-like scenario, and d. wherein the game-like scenario outcome is determined as a function of the measured performances of at least a first participant and a second participant in each game-like scenario, and wherein at least the first participant and the second participant in the game-like scenario are competitors;

e. evolving the predictive model population of neural network models by a genetic algorithm until the game-like scenario outcomes predicted by the predictive model population of neural network models satisfy a success criterion, wherein the success criterion is determined as a function of a spread set by an oddsmaker and a Game Spread Ratio (GSR) calculated for each game-like scenario, and wherein the members of the predictive model population that satisfied the success criterion are designated as members of the parent generation which will be used to create the next generation, and f. wherein a gene in the genetic algorithm represents one neural network weight associated with data predictive of one game-like scenario participant's performance in the game-like scenario, and wherein the parent generation is filled to replace models that did not satisfy the success criterion, and wherein some of the replacement neural network models are determined as a function of the parent generation, and g. wherein some of the replacement neural network models are determined as a function of randomized data; and, h. providing access to the evolved predictive model population of neural network models to predict a future game-like scenario outcome determined as a function of historical data input, and 1. to provide a recommended betting choice from among at least the first participant and the second participant, wherein the recommended betting choice is based on predicted outcomes selectively filtered as a function of the measured performances of at least the first participant and the second participant in each game-like scenario; and wherein the processor then stores the updated game spread ratio in the memory; and wherein the apparatus' display device then displays the evolved predictive model population of neural network models to display a predicted future game outcome determined as a function of the processed historical data input, said prediction being either the winner of a game or a winner against a predetermined point spread of the game;

said prediction being displayed on the apparatus' display device.

2. A process to model a game-like scenario and predict a game-like scenario outcome, the process comprising:

constructing a predictive model population comprising a plurality of neural network models each configured to predict a game-like scenario outcome, wherein the game-like scenario outcome is determined as a function of the measured performances of at least a first participant and a second participant in each game-like scenario;

evolving the predictive model population of neural network models by a genetic algorithm until the game-like scenario outcomes predicted by the predictive model population of neural network models satisfy a criterion determined as a function of the measured historical performances of at least the first participant and the second participant in each game-like scenario; and, providing a user with access to the evolved predictive model population of neural network models to predict a future game-like scenario outcome determined as a function of historical data input.

3. The process of claim 2, wherein each of the plurality of neural network models is configured to predict the game-like scenario outcome determined as a function of a weight value governing the influence of a neural network input on a neural network output.

4. The process of claim 2, wherein the game-like scenario further comprises a sporting event, and wherein at least the first participant and the second participant in the game-like scenario are competitors in the sporting event, and wherein the criterion determined as a function of the measured historical performances of at least the first participant and the second participant in the game-like scenario is based on a point spread predetermined by an oddsmaker, and wherein the measured historical performances further comprise scores achieved in the sporting event.

5. The process of claim 2, wherein evolving the predictive model population by the genetic algorithm further comprises comparing the historical outcome of a game-like scenario to the outcome predicted as a function of data associated with the game-like scenario by each of the plurality of neural network models.

6. The process of claim 2, wherein evolving the predictive model population of neural network models by the genetic algorithm further comprises selectively replacing a predictive model population member failing to satisfy a success criterion, wherein the success criterion is determined as a function of the deviation of an outcome predicted by the predictive model population member from measured performances of at least the first participant and the second participant in the game-like scenario.

7. The process of claim 2, wherein evolving the predictive model population of neural network models by the genetic algorithm further comprises selectively replacing a predictive model population member failing to satisfy a success criterion with a neural network model derived from a predictive model population member satisfying the success criterion.

8. The process of claim 2, wherein evolving the predictive model population of neural network models by the genetic algorithm further comprises selectively replacing a predictive model population member failing to satisfy a success criterion with a neural network model determined as a function of randomized data selected from another predictive model population member.

9. The process of claim 2, wherein evolving the predictive model population of neural network models by a genetic algorithm further comprises identifying an error window between: a first probability that a predictive model's outcome prediction differs from a metric predetermined as a function of the measured performances of at least the first participant and the second participant; and, a second probability the metric is incorrect.

10. The process of claim 2, wherein evolving the predictive model population of neural network models by a genetic algorithm further comprises choosing a winner based on a game-like scenario predicted by the model when the performance of at least one participant in the game-like scenario predicted by the model differs from a metric predetermined as a function of the measured performances of at least the first participant and the second participant.

11. The process of claim 2, wherein predict a future game like scenario outcome determined as a function of historical data input further comprises providing the user with a recommended betting choice from among at least the first participant and the second participant, wherein the recommended betting choice is based on predicted outcomes selectively filtered as a function of the measured performances of at least the first participant and the second participant in each game-like scenario.

12. A process to model a game-like scenario and predict a game-like scenario outcome, the process comprising:
    constructing a predictive model population comprising a plurality of neural network models each configured to predict a game-like scenario outcome, wherein the game-like scenario comprises a sporting event, and wherein each of the plurality of neural network models is configured to predict the game-like scenario outcome determined as a function of a weight value governing the influence of a neural network input on a neural network output, and wherein each weight value is initialized to a value determined as a function of a category of statistical data associated with the game-like scenario, and wherein the game-like scenario outcome is determined as a function of the measured performances of at least a first participant and a second participant in each game-like scenario, and wherein at least the first participant and the second participant in the game-like scenario are competitors;
    evolving the predictive model population of neural network models by a genetic algorithm until the game-like scenario outcomes predicted by the predictive model population of neural network models satisfy a success criterion determined as a function of a spread set by an oddsmaker and a Game Spread Ratio (GSR) calculated for each game-like scenario, wherein determining the success criterion is satisfied comprises identifying an error window between: a first probability that a predictive model's outcome prediction differs from a metric predetermined as a function of the measured performances of at least the first participant and the second participant and a second probability the metric is incorrect, and wherein the members of the predictive model population that satisfied the success criterion are designated as members of the parent generation which will be used to create the next generation, and wherein the parent generation is filled to replace models that did not satisfy the success criterion with neural network models determined as a function of randomized data; and,
    providing a user with access to the evolved predictive model population of neural network models to predict a future game-like scenario outcome determined as a function of historical data input, to provide the user with a recommended betting choice from among at least the first participant and the second participant, wherein the recommended betting choice is based on predicted outcomes selectively filtered as a function of the measured performances of at least the first participant and the second participant in each game-like scenario.

13. The process of claim 12, wherein constructing a predictive model population comprising a plurality of neural network models further comprises predicting a plurality of game-like scenario outcomes.

14. The process of claim 12, wherein the criterion determined as a function of a spread set by the oddsmaker and the Game Spread Ratio (GSR) is a measure of the extent to which the spread set by the oddsmaker deviates from the Game Spread Ratio (GSR).

15. The process of claim 12, wherein satisfy a criterion determined as a function of a spread set by an oddsmaker and a calculated Game Spread Ratio (GSR) further comprises an indication the predictive model is satisfactorily trained.

16. The process of claim 12, wherein evolving the predictive model population of neural network models by a genetic algorithm further comprises a gene in the genetic algorithm representing one neural network weight associated with one game-like scenario participant.

17. A process to model a game-like scenario and predict a game-like scenario outcome, the process comprising:
    constructing a predictive model population comprising a plurality of neural network models each configured to predict a game-like scenario outcome, wherein the game-like scenario comprises a sporting event, and wherein each of the plurality of neural network models is configured to predict the game-like scenario outcome determined as a function of a weight value governing the influence of a neural network input on a neural network output, and wherein each weight value is initialized to a value determined as a function of a category of statistical data associated with the game-like scenario, and wherein the game-like scenario outcome is determined as a function of the measured performances of at least a first participant and a second participant in each game-like scenario, and wherein at least the first participant and the second participant in the game-like scenario are competitors;
    evolving the predictive model population of neural network models by a genetic algorithm until the game-like scenario outcomes predicted by the predictive model population of neural network models satisfy a success criterion, wherein the success criterion is determined as a function of a spread set by an oddsmaker and a Game Spread Ratio (GSR) calculated for each game-like scenario, and wherein the members of the predictive model population that satisfied the success criterion are designated as members of the parent generation which will be used to create the next generation, and wherein a gene in the genetic algorithm represents one neural network weight associated with data predictive of one game-like scenario participant's performance in the game-like scenario, and wherein the parent generation is filled to replace models that did not satisfy the success criterion, and wherein some of the replacement neural network models are determined as a function of the parent generation, and wherein some of the replacement neural network models are determined as a function of randomized data; and, providing a user with access to the evolved predictive model population of neural network models to predict a future game-like scenario outcome determined as a function of historical data input, to provide the user with a recommended betting choice from among at least the first participant and the second participant, wherein the recommended betting choice is based on predicted outcomes selectively filtered as a function of the measured performances of at least the first participant and the second participant in each game-like scenario.

18. The process of claim 17, wherein the recommended betting choice further comprises a choice to win the game-like scenario flat out.

19. The process of claim 17, wherein the recommended betting choice further comprises a choice against the spread set by the oddsmaker.

20. The process of claim 17, wherein the recommended betting choice further comprises a choice selected from the group consisting of first participant, second participant, and null.

* * * * *